US012810649B2

(12) United States Patent
Makita et al.

(10) Patent No.: US 12,810,649 B2
(45) Date of Patent: Nov. 24, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Koji Makita, Kanagawa (JP); Hideo Noro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/798,047

(22) Filed: Aug. 8, 2024

(65) Prior Publication Data

US 2024/0404317 A1 Dec. 5, 2024

Related U.S. Application Data

(63) Continuation of application No. PCT/JP2023/007942, filed on Mar. 3, 2023.

(30) Foreign Application Priority Data

Mar. 30, 2022 (JP) ................................ 2022-057091
Dec. 28, 2022 (JP) ................................ 2022-212106

(51) Int. Cl.
*G06V 40/16* (2022.01)
*G06V 10/82* (2022.01)

(52) U.S. Cl.
CPC ............ *G06V 40/161* (2022.01); *G06V 10/82* (2022.01); *G06V 40/171* (2022.01); *G06V 40/172* (2022.01)

(58) Field of Classification Search
CPC .... G06V 10/82; G06V 40/161; G06V 40/165; G06V 40/171; G06V 40/172; G06T 7/00
See application file for complete search history.

(56) References Cited

U.S. PATENT DOCUMENTS 7,868,915 B2 1/2011 Izawa
8,085,996 B2 12/2011 Ogawa
11,256,905 B2 * 2/2022 Zheng ................. G06V 10/754
(Continued)

FOREIGN PATENT DOCUMENTS

JP 2001-167110 A 6/2001
JP 2001-195582 A 7/2001
(Continued)

OTHER PUBLICATIONS

Dong Chen, et al., "Supervised Transformer Network for Efficient Face Detection," arxiv.org, Cornell University Library, 201 Olin Library Cornell University Ithaca, NY 14853, Jul. 19, 2016, XP080716692, pp. 1-17.
(Continued)

*Primary Examiner* — Boubacar Abdou Tchoussou
(74) *Attorney, Agent, or Firm* — Venable LLP

(57) ABSTRACT

At least one processor detects a face candidate area from an image, using a face detector, acquires a position of a facial organ from an image of the face candidate area, using a facial organ detector, generates a transformed image obtained by transforming the image of the face candidate area based on the position of the facial organ, and controls whether or not to output the image of the face candidate area based on a result of a face detection process performed on the transformed image.

19 Claims, 17 Drawing Sheets

(56) References Cited

U.S. PATENT DOCUMENTS

| | | | | |
|---|---|---|---|---|
| 11,482,041 | B2 * | 10/2022 | Tagra | G06V 10/761 |
| 11,619,993 | B2 * | 4/2023 | Sharma | G06F 3/013 345/157 |
| 2008/0192122 | A1 | 8/2008 | Izawa | |
| 2008/0304749 | A1 | 12/2008 | Ogawa | |
| 2011/0199499 | A1 | 8/2011 | Tomita | |
| 2022/0121839 | A1 * | 4/2022 | Tagra | G06V 40/172 |
| 2023/0252820 | A1 * | 8/2023 | Nada | G06T 7/00 382/115 |

FOREIGN PATENT DOCUMENTS

| | | | |
|---|---|---|---|
| JP | 2001-331804 | A | 11/2001 |
| JP | 2004-046567 | A | 2/2004 |
| JP | 2008-197762 | A | 8/2008 |
| JP | 2008-197763 | A | 8/2008 |
| JP | 2008-199146 | A | 8/2008 |
| JP | 2008-305342 | A | 12/2008 |
| JP | 4884251 | B2 | 2/2012 |
| WO | 2010/044214 | A1 | 4/2010 |

OTHER PUBLICATIONS

Cha Zhang, et al., "A Survey of Recent Advances in Face Detection," Technical Report MSR-TR-2010-66, XP055097852, retrieved from the Internet (on Jan. 22, 2014): URL:http://research.microsoft.com/pubs/132077/facedetsurvey.pdf, Jun. 1, 2010, pp. 1-17.

Insaf Adjabi, et al., "Past, Present, and Future of Face Recognition: A Review," Electronics, vol. 9, No. 8, Jul. 23, 2020, p. 1188 et seq., XP093336138, retrieved from the Internet: URL:https://www.mdpi.com/2079-9292/9/8/1188/pdf, 52 pages.

Feb. 12, 2026 European Official Action in European Patent Appln. No. 23779224.7.

Rajeev Ranjan, et al., "HyperFace: A Deep Multi-Task Learning Framework for Face Detection, Landmark Localization, Pose Estimation, and Gender Recognition," IEEE Transactions on Pattern Analysis and Machine Intelligence, vol. 41, No. 1, Jan. 2019, https://ieeexplore, ieee.org/document/8170321 (retrieved Apr. 11, 2023), pp. 121-135.

Apr. 25, 2023 International Search Report in International Patent Appln. PCT/JP2023/007942.

"A Survey of Recent Advances in Face Detection".

"Past, Present, and Future of Face Recognition: A Review".

"Supervisded Transformer Network for Efficient Face Detection".

* cited by examiner

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATIONS

This application is a continuation of International Patent Application No. PCT/JP2023/007942 filed on Mar. 3, 2023, which claims the benefit of Japanese Patent Application No. 2022-057091 filed on Mar. 30, 2022 and Japanese Patent Application No. 2022-212106 filed on Dec. 28, 2022, all of which are hereby incorporated by reference herein in their entirety.

BACKGROUND OF THE INVENTION

Field of the Invention

The present invention relates to an image processing apparatus, an image processing method, and a non-transitory computer-readable storage medium.

Background Art

Conventionally, as a method for detecting a person's face from an image, there is a method of searching an image for a person's face area and outputting a face candidate area whose likelihood is greater than or equal to a certain value as a detection result. Since a face may not exist in the face candidate area detected by this method, it is further determined whether or not the face candidate area with a high likelihood is a face area. In addition, when creating images for a machine learning model to learn a face detection method, a face authentication method, or the like, and images used in a face authentication system, it is necessary to eliminate low-quality images that do not show people's faces. Considering the above problems, Japanese Patent No. 4884251 proposes a method of detecting facial organs such as the inner corners of both eyes and the center of the mouth from a face candidate area with a high likelihood, and determining whether or not the face candidate area with a high likelihood is a face area based on the number of detected facial organs.

CITATION LIST

Patent Literature

PTL1: Japanese Patent No. 4884251

However, with the method according to Patent Document 1, when a face candidate area with a high likelihood does not include a human face but the number of detected facial organs is large, the face candidate area with a high likelihood is determined to be a face area. On the other hand, with the method according to Patent Document 1, when a person's face is captured in a face candidate area with a low likelihood, but the number of detected facial organs is small, the face candidate area with a low likelihood is determined to be not a face area. In this way, the technique according to Patent Document 1 has a problem in that the accuracy of determining whether or not a face candidate area is a face area is low, so that an image that does not include a face may be created.

Therefore, the present invention aims to improve the accuracy of extracting an image in which a person's face is captured from images.

SUMMARY OF THE INVENTION

To achieve an object of the present invention, an image processing apparatus according to an embodiment of the present invention has the following configuration. That is to say, the image processing apparatus includes: detection means for detecting a face candidate area from an image, using a first face detector; acquisition means for acquiring a position of a facial organ from an image of a first area detected as the face candidate area, using a facial organ detector; generation means for generating a transformed image obtained by transforming the image of the first area based on the position of the facial organ; and control means for controlling whether or not to output the image of the first area based on a result of detection of a face detected from the transformed image using a second face detector.

The present invention in its one aspect provides an image processing apparatus comprising at least one memory storing instructions, and at least one processor, upon execution of the stored instructions, the stored instructions cause the at least one processor to detect a face candidate area from an image, using a face detector, acquire a position of a facial organ from an image of the face candidate area, using a facial organ detector, generate a transformed image obtained by transforming the image of the face candidate area based on the position of the facial organ, and control whether or not to output the image of the face candidate area based on a result of a face detection process performed on the transformed image.

Further features of the present invention will become apparent from the following description of exemplary embodiments with reference to the attached drawings.

DESCRIPTION OF THE EMBODIMENTS

Figure 1:
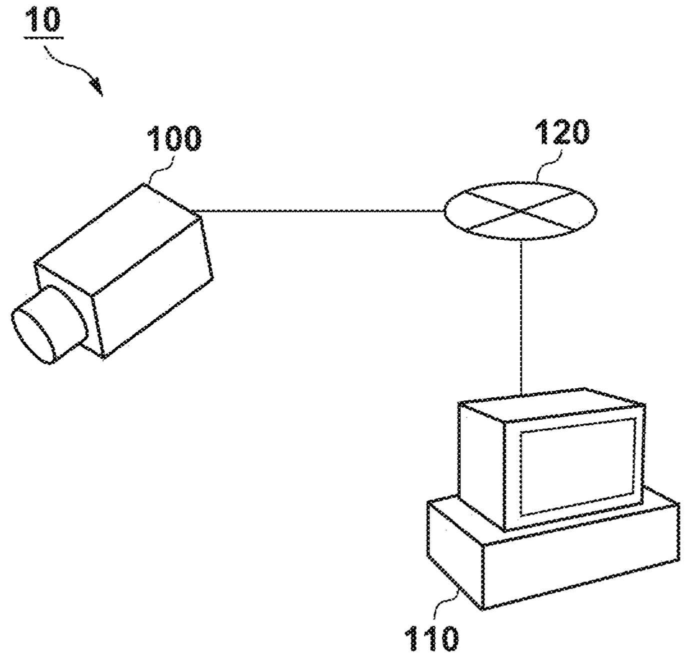
FIG. 1 is a diagram showing an example of a hardware configuration of an image processing system (a first embodiment).

Hereinafter, embodiments will be described in detail with reference to the attached drawings. Note that the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The present embodiment can be used as an image processing system that combines an imaging apparatus and an image processing apparatus.

FIG. 1 is a diagram showing an example of a hardware configuration of an image processing system according to a first embodiment.

An image processing system 10 includes an imaging apparatus 100, an image processing apparatus 110, and a network 120.

The imaging apparatus 100 is a camera that captures an image of a subject, and is, for example, a digital camera or a network camera. Although the imaging apparatus 100 is one camera, it may be two or more cameras.

The image processing apparatus 110 is an apparatus that detects a candidate face area and the positions of facial organs of a person from an image, and is, for example, a desktop computer or a laptop computer, but is not limited thereto. The image processing apparatus 110 may be, for example, a smartphone, a tablet terminal, or the like.

The network 120 connects the imaging apparatus 100 and the image processing apparatus 110. The network 120 is, for example, a wired LAN or a wireless LAN.

Figure 2:
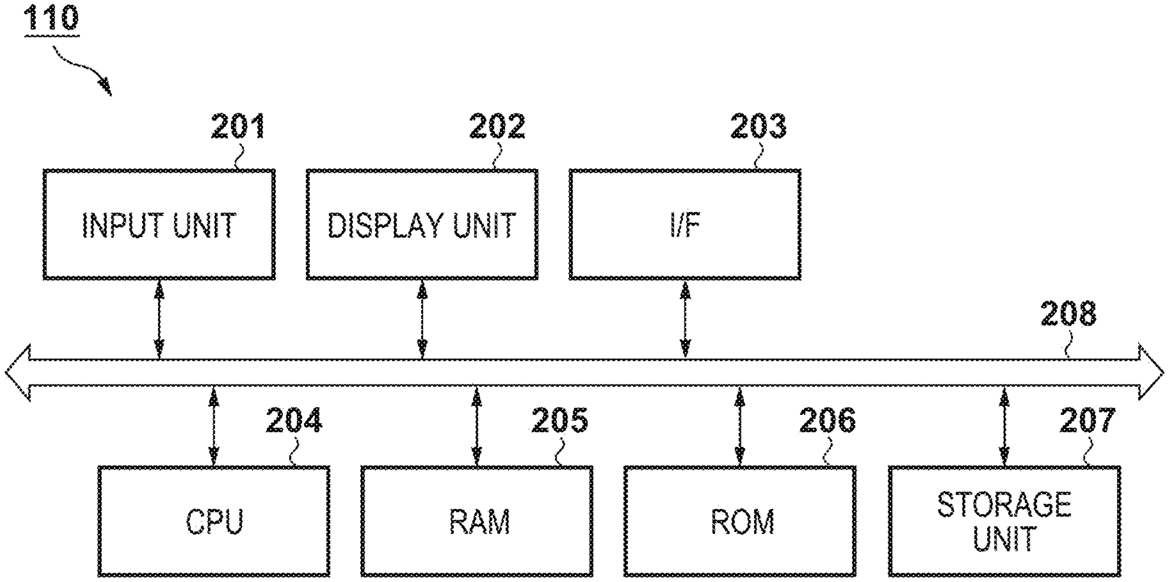
FIG. 2 is a diagram showing an example of a hardware configuration of an image processing apparatus (the first embodiment).

FIG. 2 is a block diagram showing an example of a hardware configuration of an image processing apparatus according to the first embodiment.

The image processing apparatus 110 includes an input unit 201, a display unit 202, an I/F 203, a CPU 204, a RAM 205, a ROM 206, a storage unit 207, and a data bus 208.

The input unit 201 is a device through which a user inputs various data, and includes, for example, a keyboard, a mouse, a touch panel, and so on.

The display unit 202 is a device that displays various kinds of data, and includes, for example, a liquid crystal display (LCD).

The I/F 203 transmits and receives various kinds of information between the image processing apparatus 110 and other apparatuses (not shown) via the network 120 such as the Internet.

The CPU 204 is a processor that centrally controls each unit included in the image processing apparatus 110. The CPU 204 reads out a control program from the ROM 206, loads it into the RAM 205, and executes the program to perform various controls. The CPU 204 executes an image processing program stored in the ROM 206 and the storage unit 207, thereby realizing image processing on image data.

The RAM 205 is a temporary storage area for programs executed by the CPU 204, a work memory, or the like.

The ROM 206 stores a control program for controlling each unit included in the image processing apparatus 110.

The storage unit 207 is a device that stores various kinds of data, such as image data, setting parameters, and various programs. Furthermore, the storage unit 207 can also store data from an external apparatus (not shown) via the I/F 203.

The data bus 208 is a transmission path for transmitting data, and is used to transmit image data and so on received from an external apparatus via the I/F 203 to the CPU 204, the RAM 205, and the ROM 206. In addition, the data bus 208 is used to transmit image data and so on from the image processing apparatus 110 to an external apparatus.

Figure 3:
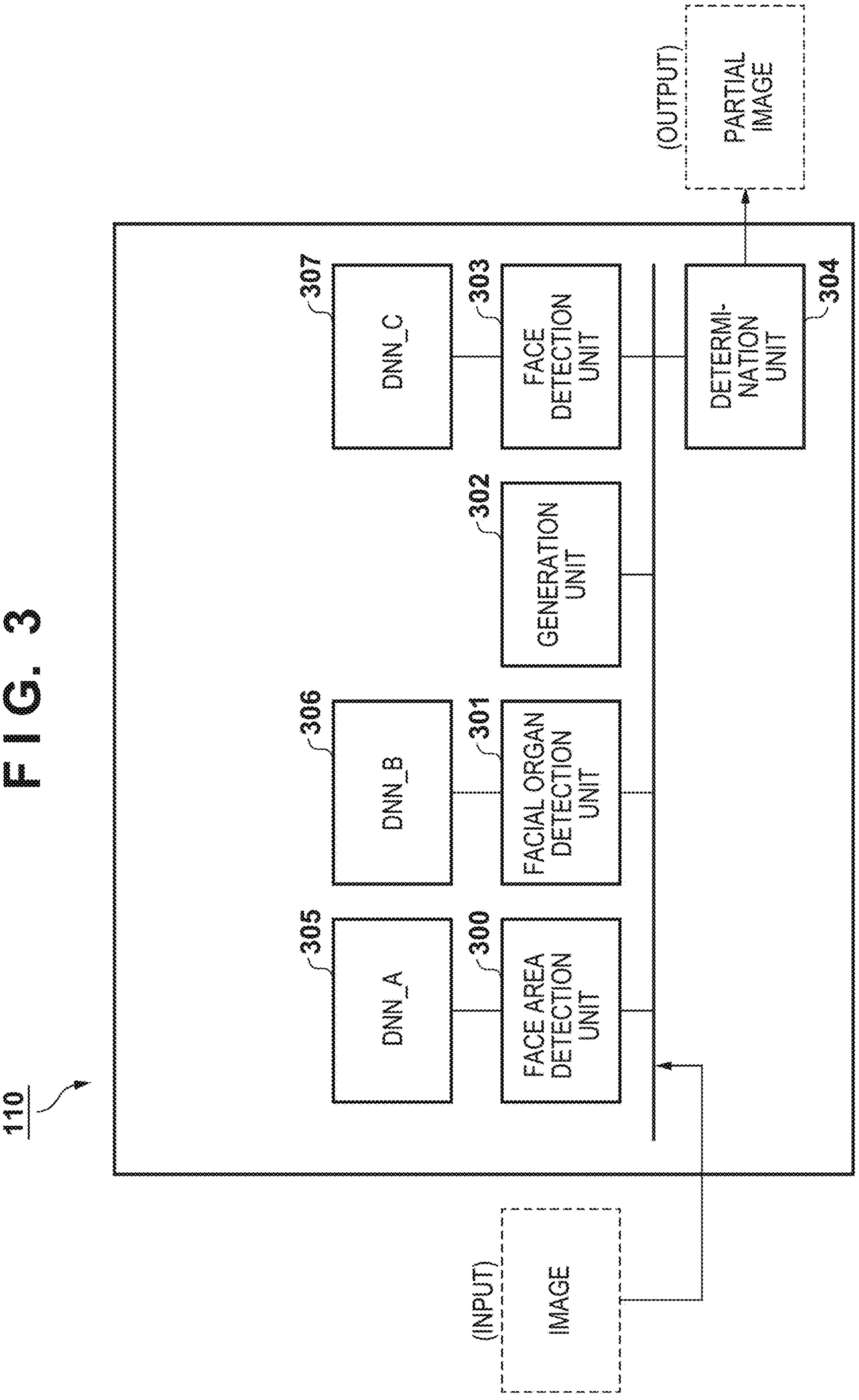
FIG. 3 is a diagram showing an example of a functional configuration of the image processing apparatus (the first embodiment).

FIG. 3 is a block diagram showing an example of a functional configuration of the image processing apparatus according to the first embodiment.

The image processing apparatus 110 includes a face area detection unit 300, a facial organ detection unit 301, a generation unit 302, a face detection unit 303, a determination unit 304, a DNN_A 305, a DNN_B 306, and a DNN_C 307. DNN is an abbreviation for Deep Neural Network.

The face area detection unit 300 acquires an image from the storage unit 207 or the like. The image is at least one of an image captured by the imaging apparatus 100 and an image stored in advance in the storage unit 207 or the like. The face area detection unit 300 detects a face candidate area of a person in the image using the DNN_A 305, and generates an image including the face candidate area. The face area detection unit 300 transmits the image including the face candidate area to the facial organ detection unit 301.

The facial organ detection unit 301 receives the image including the face candidate area from the face area detection unit 300. The facial organ detection unit 301 detects facial organs from the face candidate area in the image, using the DNN_B 306. Furthermore, the facial organ detection unit 301 transmits information regarding the facial organs detected from the face candidate area, to the generation unit 302. Information regarding the facial organs includes, for example, information such as the position (two-dimensional coordinates), size, and orientation of each facial organ.

The generation unit 302 receives information regarding the facial organs detected from the face candidate area, from the facial organ detection unit 301. The generation unit 302 transforms the image through geometric transformation (for example, affine transformation) based on the information regarding the facial organs to generate a transformed image. Furthermore, the generation unit 302 transmits the transformed image to the face detection unit 303.

The face detection unit 303 receives the transformed image from the generation unit 302. The face detection unit 303 detects a person's face from the transformed image using the DNN_C307. Furthermore, the face detection unit 303 transmits the result of the detection to the determination unit 304.

The determination unit 304 receives the transformed image from the generation unit 302. The determination unit 304 receives the result of the detection of a person's face, detected from the transformed image, from the face detection unit 303. Thereafter, the determination unit 304 determines whether or not to output information indicating the detected area, detected as the face candidate area from the original image, as information indicating the area of the face, based on the result of the detection of a person's face in the transformed image. Furthermore, the determination unit 304 outputs the detected area of the original image determined to be a facial area to the storage unit 207 or the like based on the result of the determination.

In the present embodiment, the DNN_A305 for the face area detection unit 300, the DNN_B306 for the facial organ detection unit 301, and the DNN_C 307 for the face detection unit 303 are different from each other, but the present invention is not limited in this way. For example, the DNN for the face area detection unit 300 and the DNN for the face detection unit 303 may be the same. In addition, when a DNN that can simultaneously detect a face candidate area and facial organs is available, the DNNs for the face area detection unit 300, the facial organ detection unit 301, and the face detection unit 303 may all be the same. Here, the DNN for the face area detection unit 300 is defined as a "first face detector," the DNN for the facial organ detection unit 301 is defined as a "facial organ detector," and the DNN for the face detection unit 303 is defined as a "second face detector".

Generally, DNN training is performed using images captured under various image capturing conditions regarding people, such as the sizes of the images to be processed, and the sizes and orientations of the faces of the people in the images. As a result, the face area detection unit 300 and the face detection unit 303 respectively detect a face candidate area and a face area from an image with high accuracy using DNNs trained using images of people captured under various image capturing conditions. In addition, the facial organ detection unit 301 can detect the positions of facial organs from an image with high accuracy, using the DNN trained using images of face candidate areas (corresponding to images of the first area) detected by the face area detection unit 300 from images of people captured under various image capturing conditions. Hereinafter, Examples 1 to 3 will be described in which different DNNs are respectively applied to the face area detection unit 300 and the face detection unit 303 so that the detection accuracy of the face candidate area and the face area can be effectively improved. Although the methods in Examples 1 to 3 are independent methods, the methods in Examples 1 to 3 may be used in combination.

Example 1

When the sizes of the input images to the face area detection unit 300 is arbitrary and the sizes of the input images to the face detection unit 303 are fixed, the DNN for the face area detection unit 300 and the DNN for the face detection unit 303 may be different from each other. For example, the DNN for the face area detection unit 300 is a general-purpose DNN that can operate regardless of the sizes of the images. On the other hand, the DNN for the face detection unit 303 is a DNN obtained by additionally training a general-purpose DNN using training data in which the sizes of the images are fixed.

Example 2

There are large variations in the sizes and orientations of the faces of the people captured in the input images to the face area detection unit 300. On the other hand, the variations in sizes, orientations, etc. of the faces of the people captured in the input images to the face detection unit 303, i.e., the transformed images generated (transformed) by the generation unit 302, are smaller than the variations in sizes, orientations, etc. of the faces captured in the input images to the face area detection unit 300. In this case, the DNN for the face area detection unit 300 and the DNN for the face detection unit 303 may be different from each other. For example, the DNN for the face area detection unit 300 is a general-purpose DNN that can operate regardless of the sizes and orientations of the faces. On the other hand, the DNN for the face detection unit 303 is a DNN obtained by additionally training a general-purpose DNN using training data created using the transformation method carried out by the generation unit 302 (i.e., transformed images). Note that additional training for the general-purpose DNN may be performed in advance using software, a training apparatus, or the like that are separate from the image processing apparatus 110. Alternatively, as in the third embodiment described later, a general-purpose DNN may be trained using a learning unit 1905 connected to the image processing apparatus 110 and the input images to the image processing apparatus 110.

Example 3

Face authentication systems that require high-speed operation in real time, face authentication systems that operate on computers with small physical hardware size and low processing performance (e.g. cameras, smartphones), or the like, face detection processing with low computational complexity is required. In this case, it is preferable to apply a combination of a DNN_1, which has a small number of DNN layers and a low correct detection rate, and a DNN_2, which has a large number of DNN layers and a high correct detection rate, to the face authentication system. In general, the larger the image size is, the more DNN calculations will be required. Therefore, for example, when the input image to the face area detection unit 300 is larger than the input image to the face detection unit 303, it is preferable to apply the DNN_1 to the face area detection unit 300 and the DNN_2 to the face detection unit 303. In addition, when the input image to the face area detection unit 300 is smaller than the input image to the face detection unit 303, it is preferable to apply the DNN_2 to the face area detection unit 300 and the DNN_1 to the face detection unit 303. On the other hand, for example, when there is a requirement to minimize the number of DNN calculations due to design constraints such as the allocation of calculation resources for the face authentication system, it is preferable to apply the DNN_1, which can operate with the least calculation resources, to each of the face area detection unit 300 and the face detection unit 303. In addition, when there are many computational resources that can be allocated to the face authentication system, from the perspective of maximizing the authentication accuracy of the face authentication system, it is preferable to apply the DNN_2, which can operate with the most computational resources, to each of the face area detection unit 300 and the face detection unit 303. Not only the above examples of DNN_1 and DNN_2, DNN_3 that can operate with intermediate calculation resources between those of the DNN_1 and the DNN_2 may be provided. That is to say, it is possible to appropriately select DNNs to be respectively assigned to the face area detection unit 300 and the face detection unit 303 based on the overall computational resources for the face authentication system, DNNs that can operate with various computational resources, and the operating environment.

Figure 4:
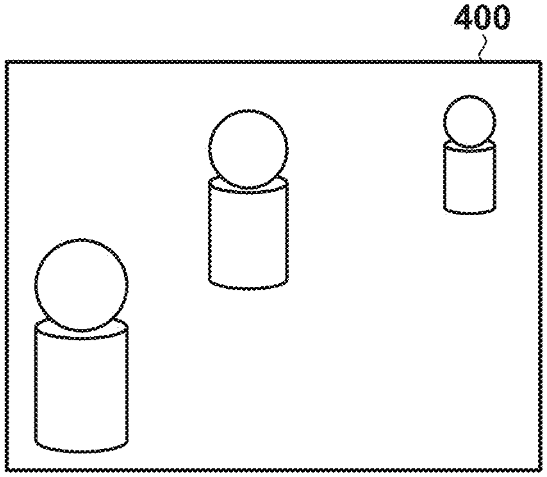
FIG. 4 is a diagram showing an example of an image to be subject to image processing (the first embodiment).

FIG. 4 is a diagram showing an example of an image to be subject to image processing according to the first embodiment. Three people are captured in an image 400. The number of people in the image 400 is not limited to three, and may be two or less or four or more.

Figure 5:
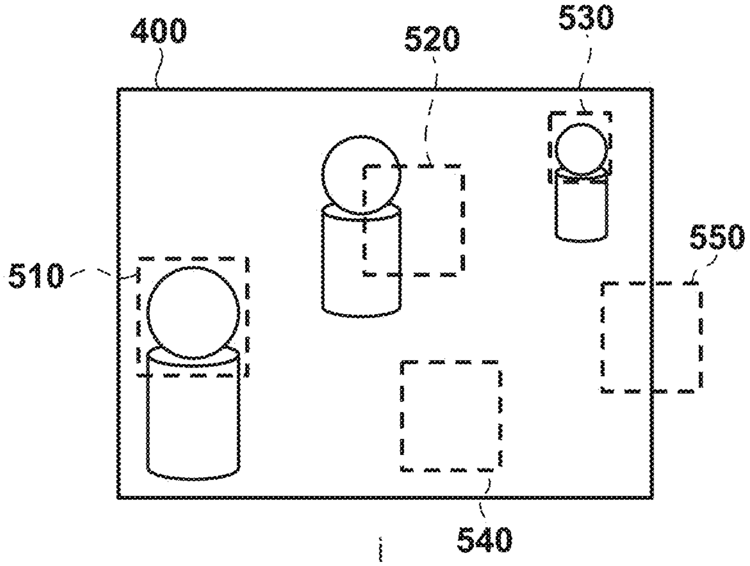
FIG. 5 is a diagram showing an example of a result of detection of a face candidate area (the first embodiment).

FIG. 5 is a diagram showing an example of a result of detection of a face candidate area according to the first embodiment.

FIG. 5 shows examples of five face candidate areas detected by the face area detection unit 300 from the image 400. The image 400 includes an area 510, an area 520, an area 530, an area 540, and an area 550.

The area 510 is an area that includes a person's face. The area 520 is an area that includes a portion of the right side of a person. The area 530 is an area that includes a person's face. The area 540 is an area that does not include a person's face. The area 550 is an area that does not include a person's face. A portion of the area 550 protrudes outwards of the image 400. In such a case, the face area detection unit 300 complements the portion of the area 550 located outside of the image 400 with pixels having a brightness value of 0. Note that the face area detection unit 300 may complement the portion of the area 550 with a brightness value other than 0, for example, or complement the portion of the area 550 with a brightness value of a partial area of the original image or a brightness value obtained by inverting the partial area.

Figure 6:
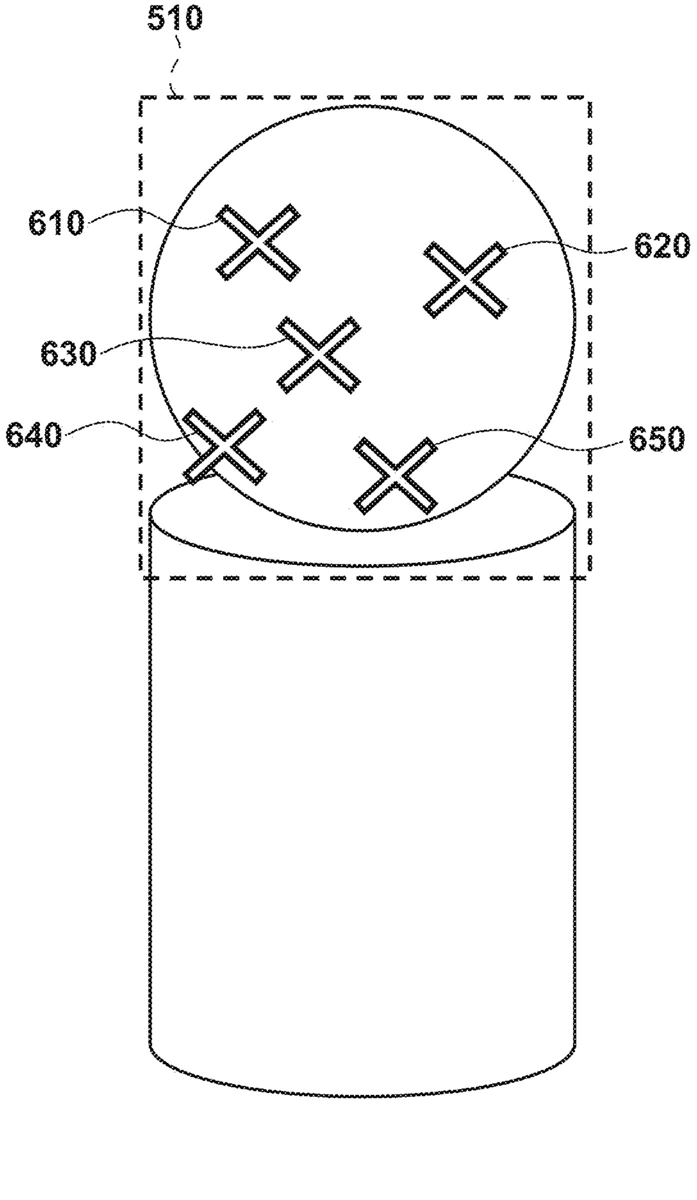
FIG. 6 is a diagram showing an example of a result of detection of facial organs detected from a face candidate area (the first embodiment).

FIG. 6 is a diagram showing an example of a result of detection of facial organs detected from a face candidate area according to the first embodiment.

FIG. 6 shows an example in which the facial organ detection unit 301 has detected five facial organs from the area 510. The area 510 includes a facial organ 610, a facial organ 620, a facial organ 630, a facial organ 640, and a facial organ 650.

When the area 510 includes all of the facial organs 610 to 650 in this way, the generation unit 302 generates a partial image, which will be described later, by transforming the area 510. On the other hand, when the area 510 includes four or less facial organs, or when the facial organs are located outside of the area 510, the generation unit 302 terminates processing without generating a partial image from the area 510.

Figure 7:
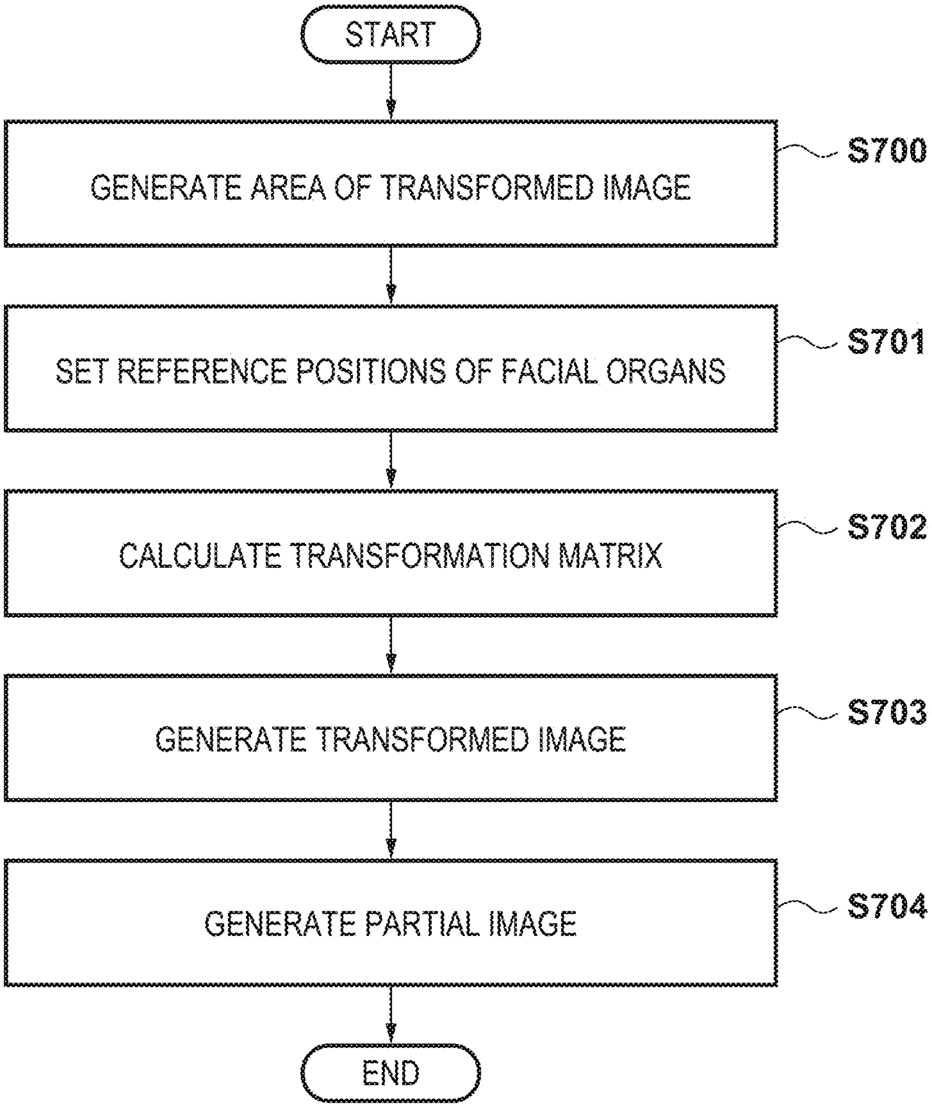
FIG. 7 is a flowchart illustrating a flow of processing that is performed to generate a transformed image (the first embodiment).

FIG. 7 is a flowchart illustrating the flow of processing that is performed to generate a transformed image according to the first embodiment. The generation unit 302 performs geometric image transformation on the image based on information regarding facial organs (for example, positions) to generate a transformed image. Hereinafter, transformed image generation processing performed by the generation unit 302 will be described.

In S700, the generation unit 302 generates a transformed image area. The transformed image area is an area that is set based on the size and shape of the desired image. For example, the generation unit 302 generates a square area of 112×112 pixels as the transformed image area.

In S701, the generation unit 302 sets reference positions 810 to 850 (FIG. 8) of facial organs corresponding to the five facial organs 610 to 650 in the transformed image area. The reference positions of the facial organs are positions defined in advance as positions of the facial organs in the transformed image area.

When generating the transformed image, the generation unit 302 transforms the image so that the positions of the five facial organs 610 to 650 are as close as possible to the reference positions 810 to 850. For example, the reference positions 810 to 850 in FIG. 8 are average positions of facial organs acquired from face images of a large number of people captured from the front.

Examples of the reference positions 810 to 850 will be described. First, when the upper left of the square area of 112×112 pixels is the origin, the direction to the right with respect to the image is the positive X direction, and the downward direction with respect to the image is the positive Y direction. Next, the positions of the center of the left eye, the center of the right eye, the tip of the nose, the left end point of the mouth, and the right end point of the mouth are each represented by two-dimensional coordinates (X,Y). As a result, the generation unit 302 sets the two-dimensional coordinates (40,60), (73,60), (55,80), (42,100), and (81,100) respectively corresponding to the reference positions 810 to 850.

In S702, the generation unit 302 calculates a transformation matrix for generating the transformed image. For example, the generation unit 302 calculates a transformation matrix M that brings the positions of the five facial organs 610 to 650 as close to the reference positions 810 to 850 as possible through image transformation processing.

Figure 8:
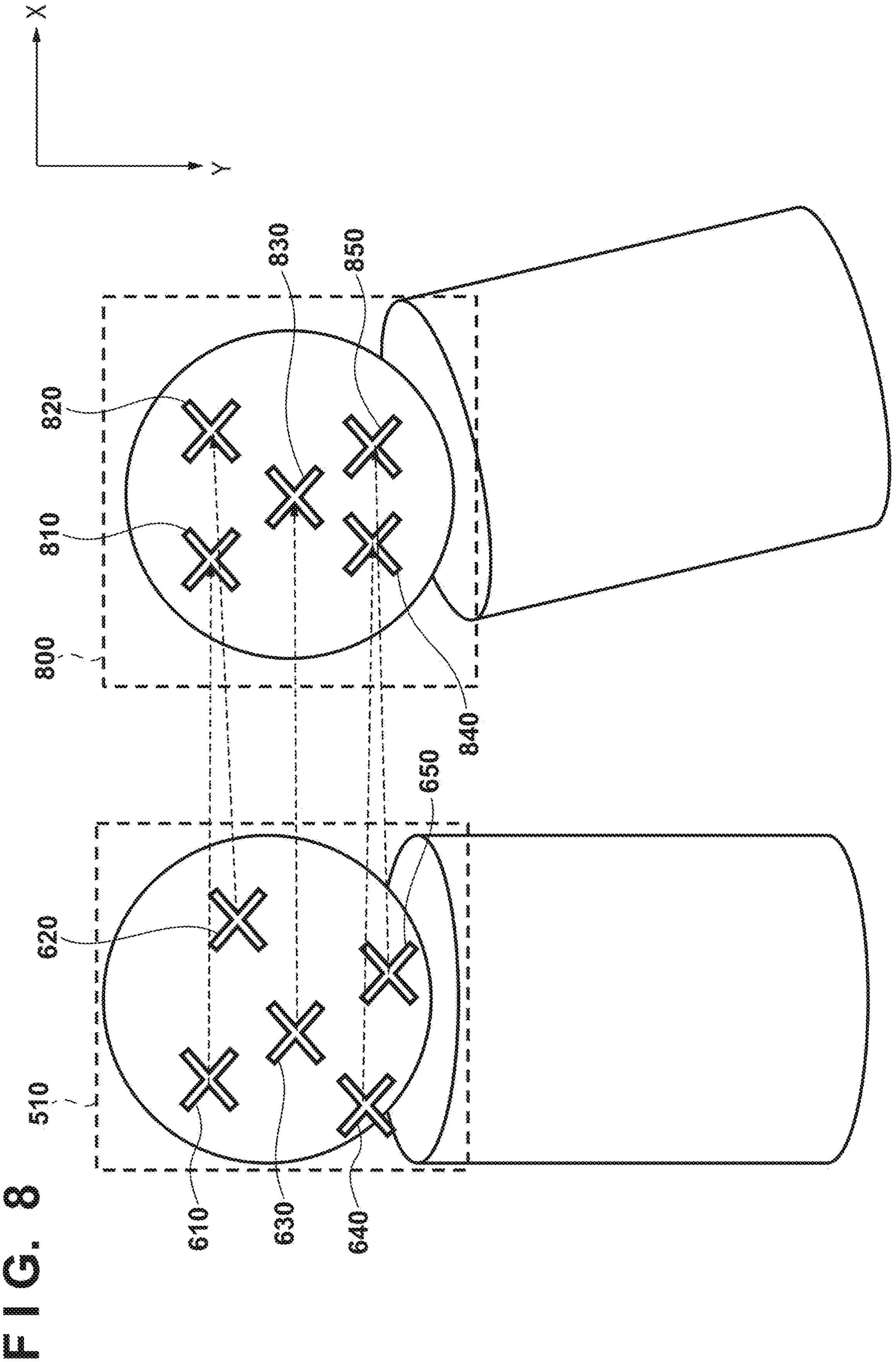
FIG. 8 is a diagram illustrating a correspondence between positions of facial organs (the first embodiment).

FIG. 8 is a diagram illustrating a correspondence between the positions of the facial organs according to the first embodiment.

FIG. 8 shows the correspondence between the positions of the five facial organs 610 to 650 and the reference positions 810 to 850. Generally, when there are four or more correspondences between the positions of the facial organs and the reference positions, there is no transformation matrix M in which all of the differences between the positions of the facial organs and the reference positions are 0. Therefore, the generation unit 302 calculates a transformation matrix M that makes the difference as small as possible through convergence calculations of the differences between the positions of the facial organs and the reference positions.

Although the generation unit 302 performs the calculation using the sum of the differences between the positions of the facial organs 610 to 650 and the reference positions 810 to 850 as the magnitude of the difference, the present invention is not limited in this way. The generation unit 302 may calculate the total value of the gradient-distributed differences by evaluating the distance between specific points as low. For example, the tip of the nose (the facial organ 630) is located at a large distance from the facial surface, and therefore, the positional shift may become large when the orientation of the face changes. Therefore, the generation unit 302 may multiply the positional difference between the point at the tip of the nose (the facial organ 630) and the reference position 830 by 0.5 to perform the calculation.

In S703, the generation unit 302 generates a transformed image by transforming the original image 400 using the transformation matrix M calculated in S702.

Figure 9:
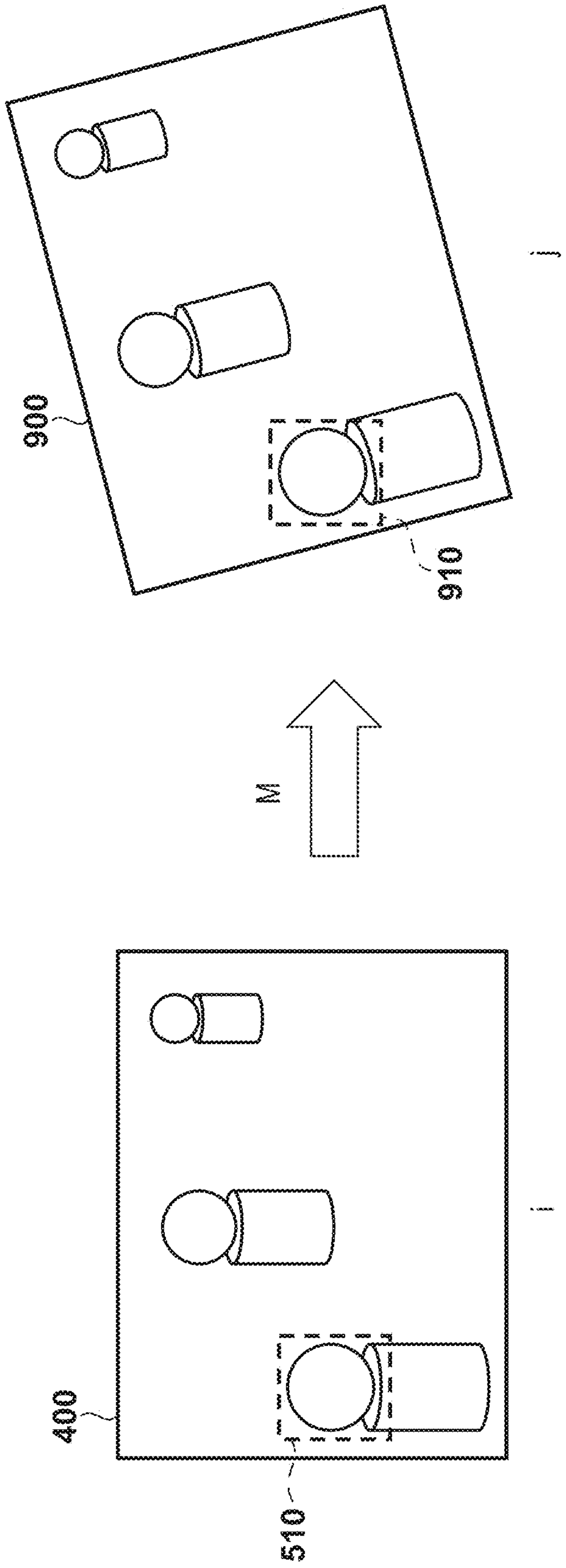
FIG. 9 is a diagram showing an overview of generating a transformed image from an image (the first embodiment).

Here, FIG. 9 is a diagram showing an overview of generating a transformed image from an image according to the first embodiment.

FIG. 9 shows the image 400, which has not undergone transformation processing, and a transformed image 900, which is the image 400 that has undergone transformation processing. The image 400 includes the area 510. The transformed image 900 is an image obtained by rotating the image 400 counterclockwise, and includes a partial image 910.

In S704, the generation unit 302 cuts out the partial image 910 from the transformed image 900 and stores the partial image 910 in the storage unit 207.

Figure 10:
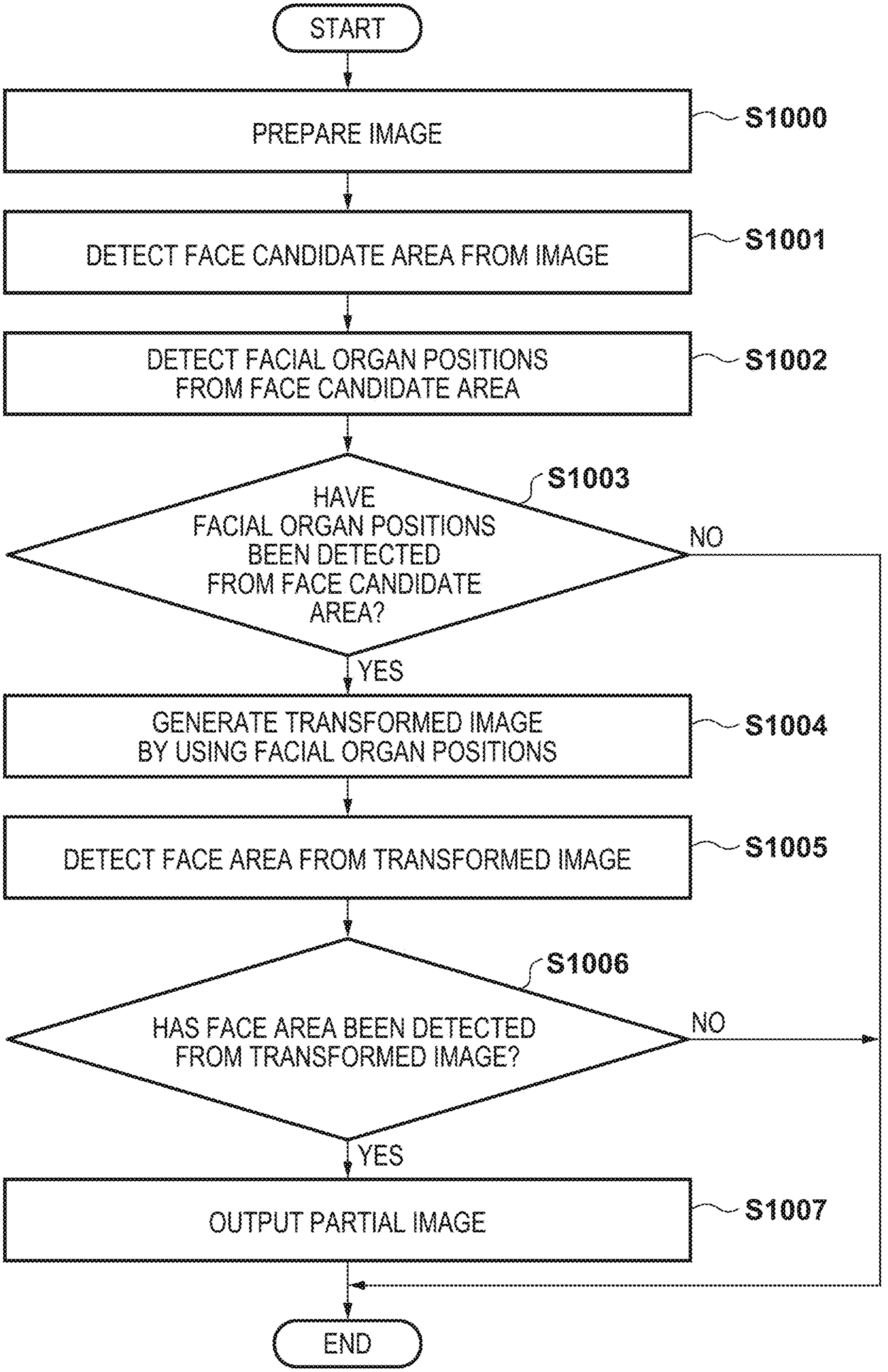
FIG. 10 is a flowchart illustrating a flow of image processing (the first embodiment).

FIG. 10 is a flowchart illustrating the flow of image processing according to the first embodiment.

In S1000, the user prepares an image in which a person's face is captured. For example, the user prepares an image of a person taken with a common digital camera. Hereinafter, a case in which the image processing apparatus 110 detects a person's face from one image will be described. Note that when detecting a person's face from two or more images, the image processing apparatus 110 sequentially performs the processing to detect a person's face from one image according to the number of images. Thereby, the image processing apparatus 110 can detect a person's face regardless of the number of images.

In S1001, the face area detection unit 300 detects a candidate face area of the person from the image acquired from the storage unit 207 or the like. Here, the face area detection unit 300 detects a rectangular area surrounded by line segments that are parallel to the vertical and horizontal directions of the image as a face candidate area. The face candidate area is not limited to a rectangular area, and may be, for example, an elliptical area around the center of the face.

In S1002, the facial organ detection unit 301 detects the positions of the facial organs from the face candidate area. The facial organs are five organs including the center of the left eye, the center of the right eye, the tip of the nose, the left end of the mouth, and the right end of the mouth, but are not limited thereto, and may be other organs. For example, the facial organs may be four end points on the top, bottom, left, and right of the eyes or the mouth.

In S1003, the generation unit 302 determines, based on the information regarding the facial organs in the face candidate area received from the facial organ detection unit 301, whether or not the five facial organs are located in the face candidate area. If the generation unit 302 determines that the five facial organs are located in the face candidate area (Yes in S1003), processing proceeds to S1004. If the generation unit 302 determines that the five facial organs are not located in the face candidate area (No in S1003), processing ends.

In S1004, the generation unit 302 performs geometric image transformation (for example, affine transformation) on the image based on the position information of the facial organs, thereby generating a transformed image.

For example, the generation unit 302 sets coordinates corresponding to the five facial features in the transformed image in advance. The generation unit 302 calculates a transformation matrix M that minimizes the difference between the positions (coordinates) of the five facial organs in the image before transformation and the positions (coordinates) of the five facial organs in the transformed image.

The generation unit 302 performs geometric image transformation on the image using the transformation matrix M to generate the transformed image. The method of transforming the image is not limited to the method using the transformation matrix M, and may be, for example, a method of rotating the image so that the left eye and the right eye are horizontal.

In S1005, the face detection unit 303 detects a face area from the transformed image. Here, the face detection unit 303 only detects the face area from the transformed image, and does not detect the positions of the facial organs.

In S1006, the determination unit 304 determines whether or not a face area has been detected from the transformed image. If the determination unit 304 determines that a face area has been detected from the transformed image (Yes in S1006), processing proceeds to S1007. If the determination unit 304 determines that a face area has not been detected from the transformed image (No in S1006), processing ends.

In S1007, the determination unit 304 outputs an image (partial image) including the face candidate area detected in S1001 to an external apparatus (for example, the storage unit 207).

Although the determination unit 304 further determines whether or not the face candidate area is a face area based on whether or not a face area is detected from the transformed image, the above determination may be performed using another determination method. For example, the determination unit 304 may determine that the face candidate area is a face area if a face area larger than or equal to a certain size is detected from the transformed image. Alternatively, the determination unit 304 may determine that a face candidate area is a face area if the face area detected from the transformed image is larger than or equal to a certain size and the distance between the center of the transformed image and the center of the face area is less than or equal to a threshold value.

In general, the face detection unit 303 can easily detect a face area from the transformed image 900. That is to say, if the face detection unit 303 cannot detect a face area from the transformed image 900, it is inferred that the detection accuracy of the area 510 or the positions of the facial organs 610 to 650 detected from the original image 400 is low. Therefore, the generation unit 302 generates the transformed image 900 by geometrically transforming the area 510 detected from the original image 400 based on the positions of the facial organs. The determination unit 304 can thereafter determine whether or not each of a plurality of face candidate areas is a face area, based on whether or not a face area is detected from the transformed image 900. As a result, it is possible to eliminate face candidate areas in which no face is captured from the image.

As described above, according to the first embodiment, it is determined whether or not a face candidate area is a face area based on whether or not a face area can be detected from a transformed image that is transformed based on the positions of facial organs in the face candidate area of an image. This improves the accuracy of determining a face area from face candidate areas, and therefore improves the accuracy of extracting an image (partial image) in which a face is captured from an image.

Second Embodiment

In the first embodiment, if a face area is not detected from the transformed image, it is determined that an image (partial image) including a face candidate area is not to be output. However, the quality required for the partial image may differ depending on the purpose of the image. In this way, determination conditions (hereinafter referred to as determination conditions for face candidate areas) for determining whether or not a face candidate area is a face area may be changed so that a partial image has a quality suited to the purpose of the image. In the second embodiment, the determination conditions for face candidate areas are changed depending on the purpose of the image. Hereinafter, in the second embodiment, the differences from the first embodiment will be described.

For example, when creating training data for training a DNN for face detection, facial organ detection, or face authentication, and when creating registration images to be registered in a face authentication system in advance, the image processing apparatus sets strict determination conditions for face candidate areas. On the other hand, when detecting a face from an image captured by an imaging apparatus during operation of a face authentication system, the image processing apparatus sets lenient determination conditions for face candidate areas. The following describes an example in which an image processing apparatus determines whether or not a face candidate area is a face area based on the determination conditions for face candidate areas according to the purpose of the image.

When creating training data for training a DNN, and when creating registration images to be registered in a face authentication system in advance, the performance of the DNN and the performance of the face authentication system may be degraded by training the DNN with low-quality images (for example, with large blur). However, images for training a DNN or for a face authentication system can be prepared in advance by spending time. Therefore, the image processing apparatus may set strict determination conditions for face candidate areas.

The face authentication system is provided with two types of authentication methods. The authentication methods are a positive authentication method and a non-positive authentication method. The positive authentication method is a method through which authentication of a user is performed in a state in which the user is voluntarily positioned in front of an imaging apparatus. In this case, the image processing apparatus can generate appropriate image data by setting strict determination conditions for face candidate areas.

The non-positive authentication is a method through which the face authentication system autonomously authenticates a user when the user does not voluntarily wish to be authenticated. Therefore, when the imaging apparatus captures an image of the user, the user may move out of the imaging range of the imaging apparatus. The orientation of the user's face in relation to the imaging apparatus (camera) also varies. In this way, the number and quality of images captured in non-positive authentication greatly depend on the imaging environment, the settings of the imaging apparatus, and so on. Therefore, in non-positive authentication, it is difficult to acquire a sufficient number of high-quality images in which the user's face is captured. In this case, the image processing apparatus can secure an appropriate amount of image data by setting lenient determination conditions for face candidate areas.

Figure 11:
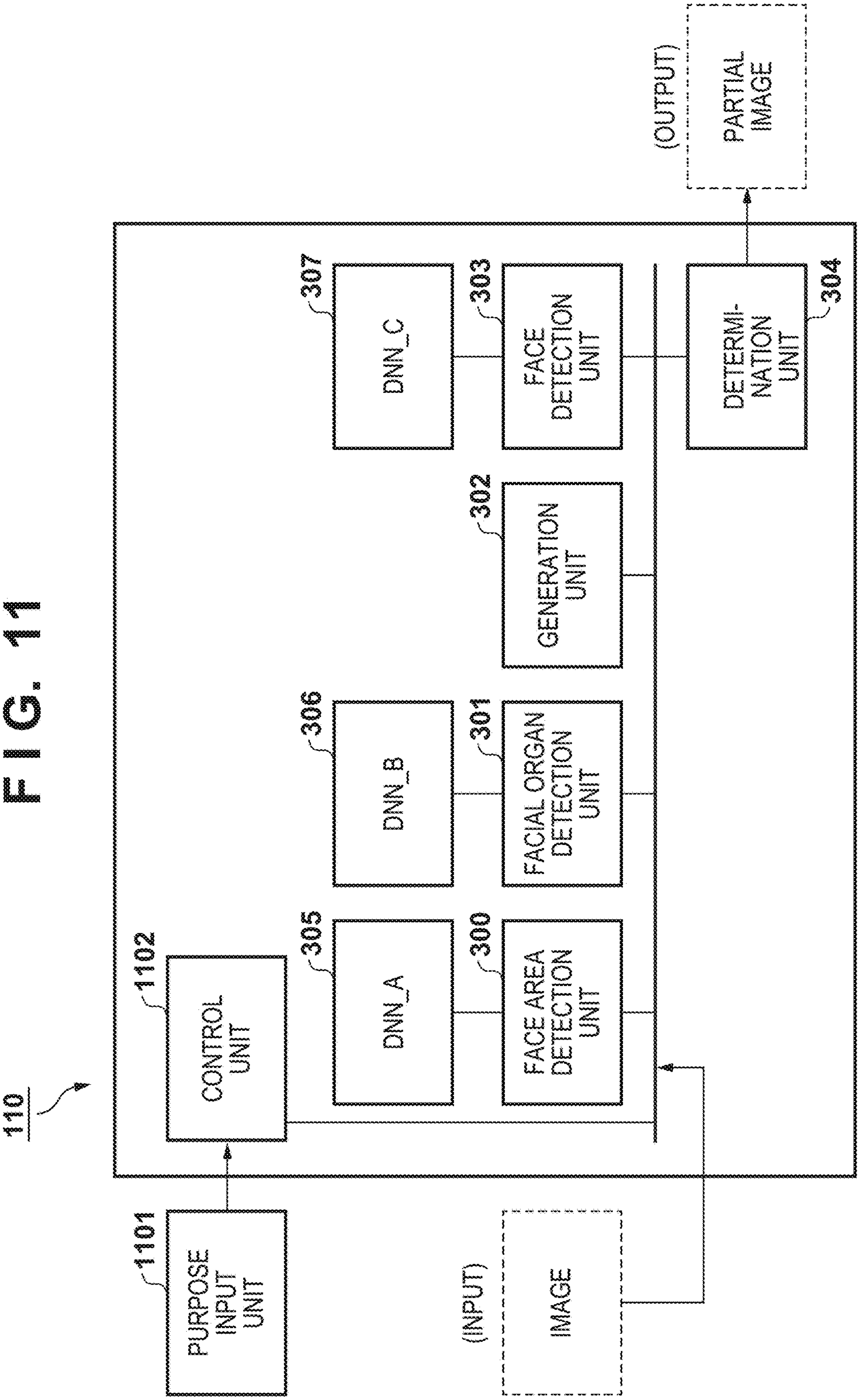
FIG. 11 is a block diagram showing an example of a functional configuration of an image processing apparatus (a second embodiment).

FIG. 11 is a block diagram showing an example of a functional configuration of the image processing apparatus according to the second embodiment.

A purpose input unit 1101 receives the purpose of the image data from the user, and transmits the purpose of the image data to a control unit 1102. The purposes of the image data are "training", "registration", and "authentication". Training refers to making an image learning model (DNN) learn the features of images. Registration refers to registering the features of the people captured in images and the names of the people in a list. Authentication refers to identifying the people in images and outputting the names of the corresponding people.

The control unit 1102 receives the purpose of the image data from the purpose input unit 1101. The control unit 1102 controls what processing is to be performed by the face area detection unit 300, the facial organ detection unit 301, the generation unit 302, the face detection unit 303, and the determination unit 304 according to the purpose of the image data. For example, when the purpose of the image data is "training" or "registration", the control unit 1102 sets strict determination conditions for face candidate areas. On the other hand, when the purpose of the training data is "authentication", the control unit 1102 sets lenient determination conditions for face candidate areas.

Figure 12:
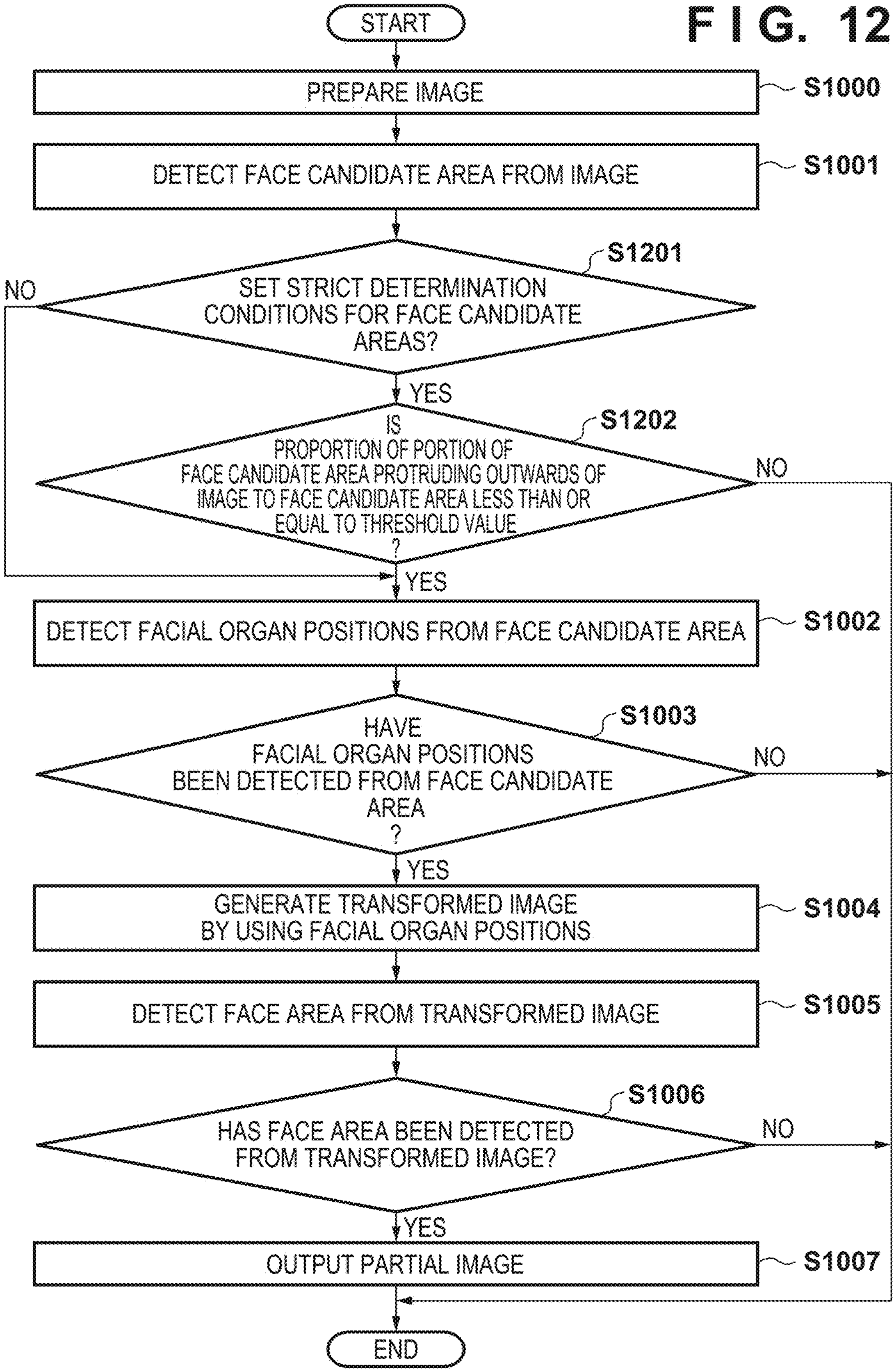
FIG. 12 is a flowchart illustrating a flow of image processing (the second embodiment).

FIG. 12 is a flowchart illustrating the flow of image processing according to the second embodiment. The processing from S1000 to S1007 is the same as that in the first embodiment, and therefore the description thereof will be omitted.

In S1201, the control unit 1102 determines whether or not to set strict determination conditions for face candidate areas based on the purpose of the image data received from the purpose input unit 1101. If the control unit 1102 determines that strict determination conditions for face candidate areas are to be set (Yes in S1201), processing proceeds to S1202. If the control unit 1102 determines that strict determination conditions for face candidate areas are not to be set (No in S1201), processing proceeds to S1002.

In S1202, the determination unit 304 determines whether or not to detect the positions of facial organs from the face candidate area, based on whether or not the proportion of the portion of the face candidate area protruding outwards of the image to the face candidate area is less than or equal to a threshold value. For example, the determination unit 304 calculates the proportion of the portion of the area 550 protruding outwards from the image 400 in FIG. 5 to the area 550. If the calculated proportion is greater than the threshold value, the determination unit 304 determines that the positions of facial organs are not to be detected from the area 550, and ends processing.

Figure 13:
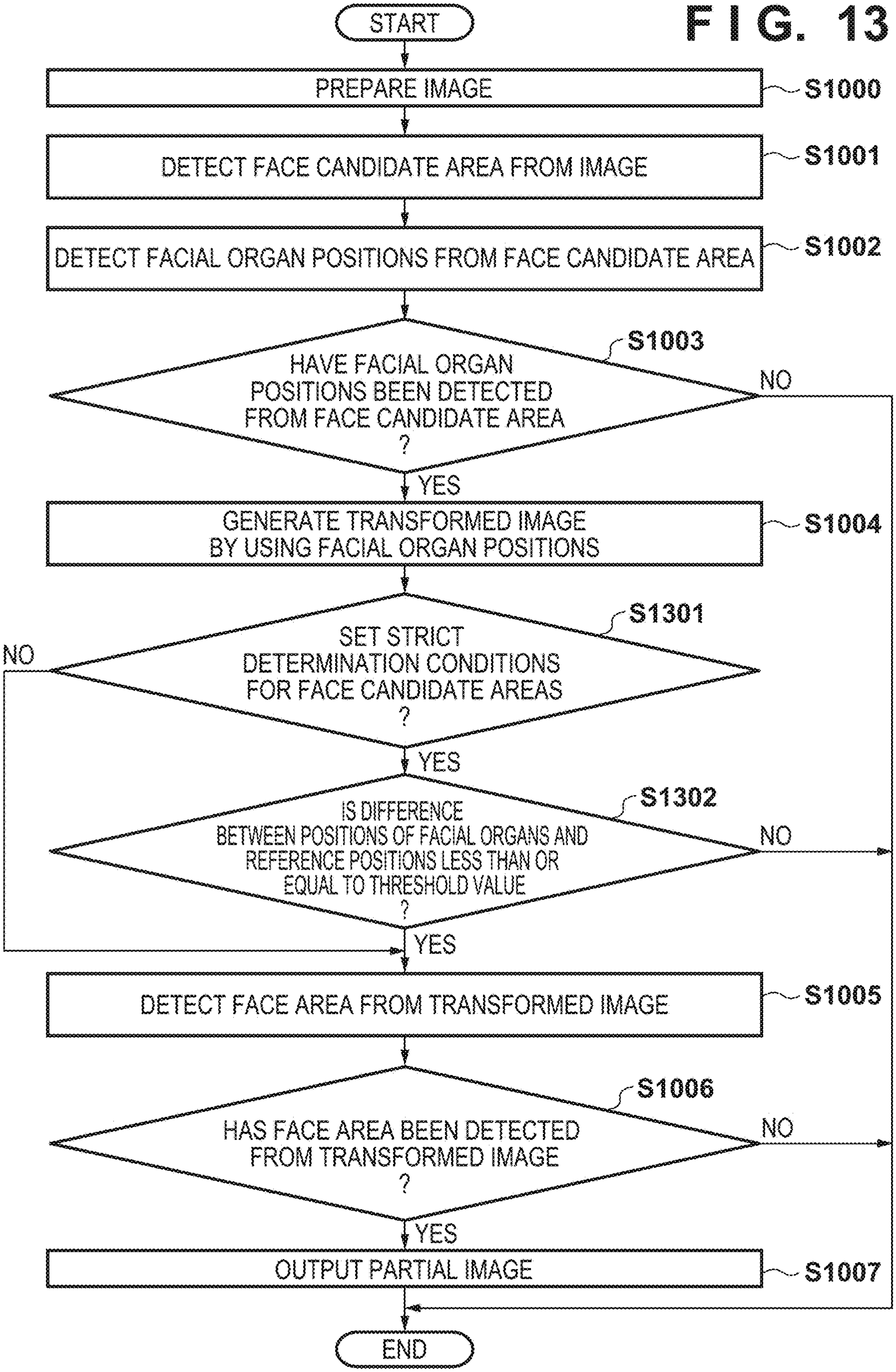
FIG. 13 is a flowchart illustrating the flow of image processing (the second embodiment).

FIG. 13 is a flowchart illustrating the flow of image processing according to the second embodiment. The processing from S1000 to S1007 is the same as that in the first embodiment, and therefore the description thereof will be omitted.

In S1301, the control unit 1102 determines whether or not to set strict determination conditions for face candidate areas based on the purpose of the image data received from the purpose input unit 1101. If the control unit 1102 determines that strict determination conditions for face candidate areas are to be set (Yes in S1301), processing proceeds to S1302.

If the control unit 1102 determines that strict determination conditions for face candidate areas are not to be set (No in S1301), processing proceeds to S1005.

In S1302, the determination unit 304 determines whether or not to detect a face area from the transformed image based on whether or not the difference between the positions of the facial organs in the face candidate area and the reference positions in the transformed image is less than or equal to a threshold value. If the determination unit 304 determines that the difference between the positions of the facial organs in the face candidate area and the reference positions in the transformed image is less than or equal to the threshold value (Yes in S1302), processing proceeds to S1005. If the determination unit 304 determines that the difference between the positions of the facial organs in the face candidate area and the reference positions in the transformed image is not less than or equal to the threshold value (No in S1302), processing ends.

Figure 14:
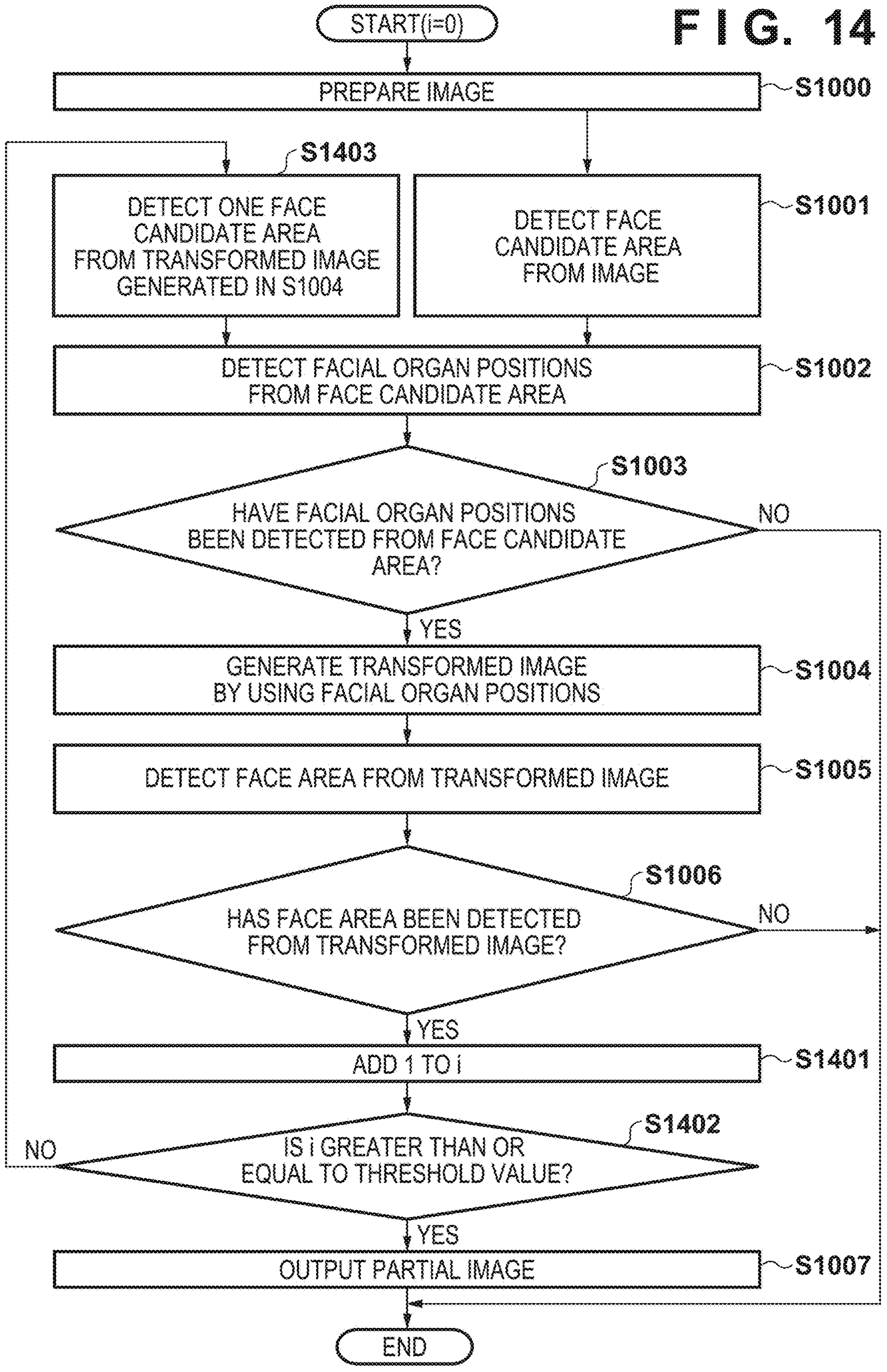
FIG. 14 is a flowchart illustrating the flow of image processing (the second embodiment).

FIG. 14 is a flowchart illustrating the flow of image processing according to the second embodiment. The processing from S1000 to S1007 is the same as that in the first embodiment, and therefore the description thereof will be omitted. At the start of processing, a variable i is set to be i=0. Note that the value of the variable i indicates the number of times a human face area is detected from the transformed image.

In S1401, the control unit 1102 adds 1 to the variable i, and processing proceeds to S1402.

In S1402, the determination unit 304 determines whether or not the variable i is greater than or equal to a threshold value. If the determination unit 304 determines that the variable i is greater than or equal to the threshold value (Yes in S1402), processing proceeds to S1007. If the determination unit 304 determines that the variable i is not greater than or equal to the threshold value (No in S1402), processing proceeds to S1403.

In S1403, the control unit 1102 detects one face candidate area from the transformed image generated in S1004, and processing proceeds to S1002. Here, when strict determination conditions for face candidate areas are to be set, the control unit 1102 sets the threshold value in S1402 to a value greater than or equal to "2". The larger the threshold value is, the stricter the determination conditions for face candidate areas are. On the other hand, when lenient determination conditions for face candidate areas are to be set, the control unit 1102 sets the threshold value in S1402 to "1".

Figure 15:
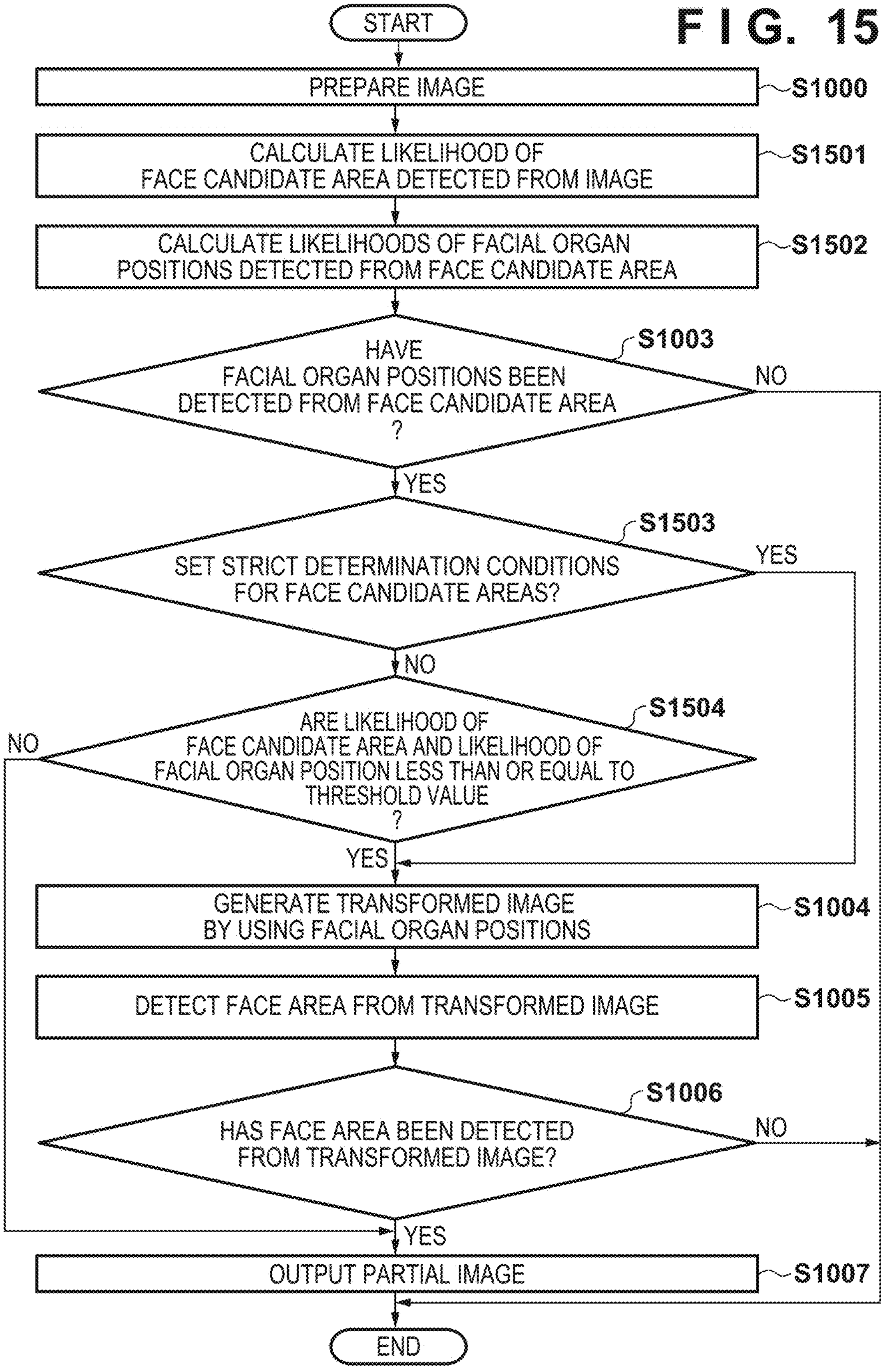
FIG. 15 is a flowchart illustrating the flow of image processing (the second embodiment).

FIG. 15 is a flowchart illustrating the flow of image processing according to the second embodiment. The processing in S1000 and S1003 to S1007 is the same as that in the first embodiment, and therefore the description thereof will be omitted.

In S1501, the face area detection unit 300 calculates the likelihood of the face candidate area detected from the image.

In S1502, the facial organ detection unit 301 calculates the likelihoods of the facial organ positions detected from the face candidate area.

In S1503, the control unit 1102 determines whether or not to set strict determination conditions for face candidate areas based on the purpose of the image data received from the purpose input unit 1101. If the control unit 1102 determines that strict determination conditions for face candidate areas are to be set (Yes in S1503), processing proceeds to S1004. If the control unit 1102 determines that strict determination conditions for face candidate areas are not to be set (No in S1503), processing proceeds to S1504.

Figure 16:
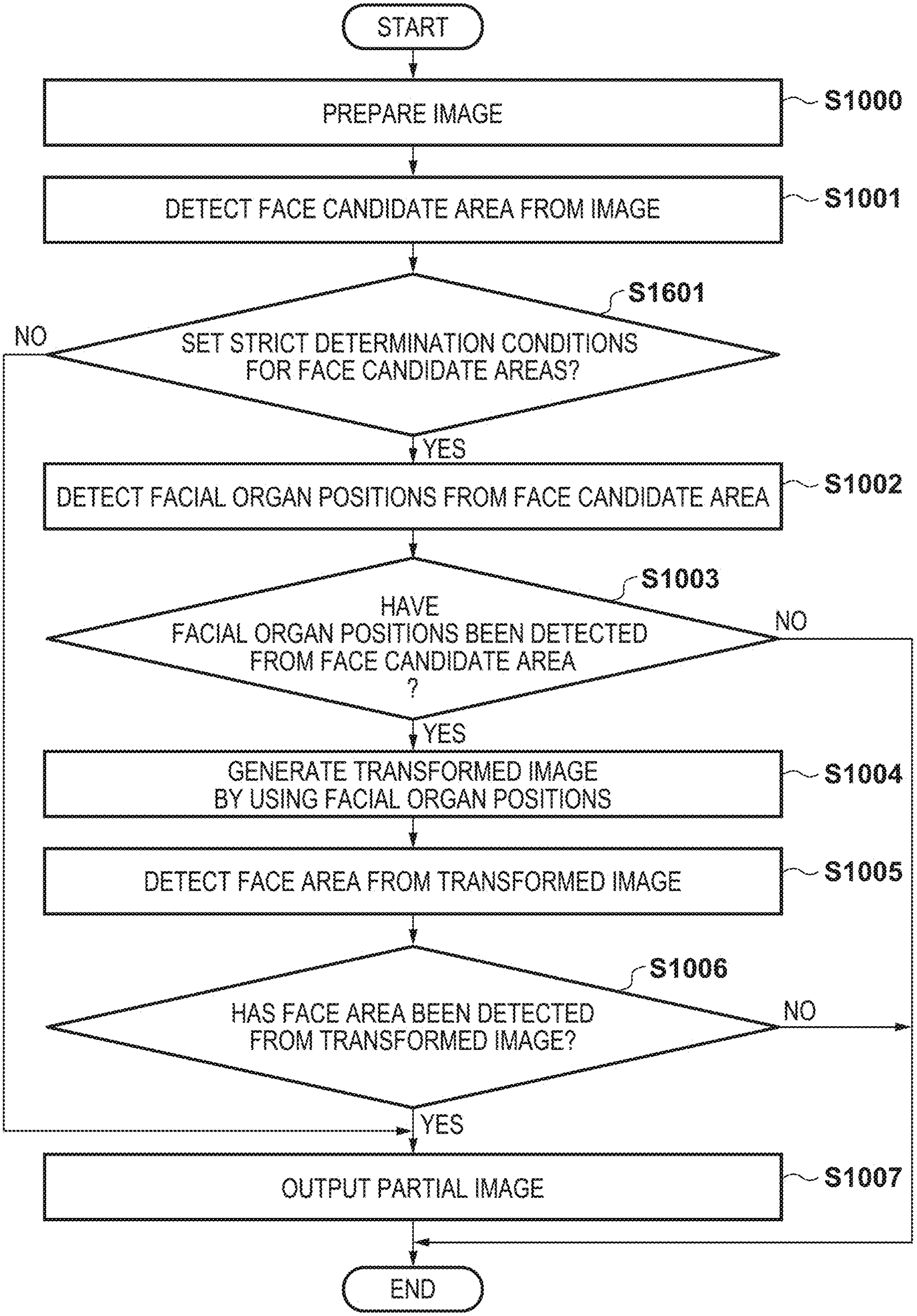
FIG. 16 is a flowchart illustrating the flow of image processing (the second embodiment).

FIG. 16 is a flowchart illustrating the flow of image processing according to the second embodiment. The processing from S1000 to S1007 is the same as that in the first embodiment, and therefore the description thereof will be omitted.

In S1601, the control unit 1102 determines whether or not to set strict determination conditions for face candidate areas based on the purpose of the image data received from the purpose input unit 1101. If the control unit 1102 determines that strict determination conditions for face candidate areas are to be set (Yes in S1601), processing proceeds to S1002. If the control unit 1102 determines that strict determination conditions for face candidate areas are not to be set (No in S1601), processing proceeds to S1007.

Figure 17:
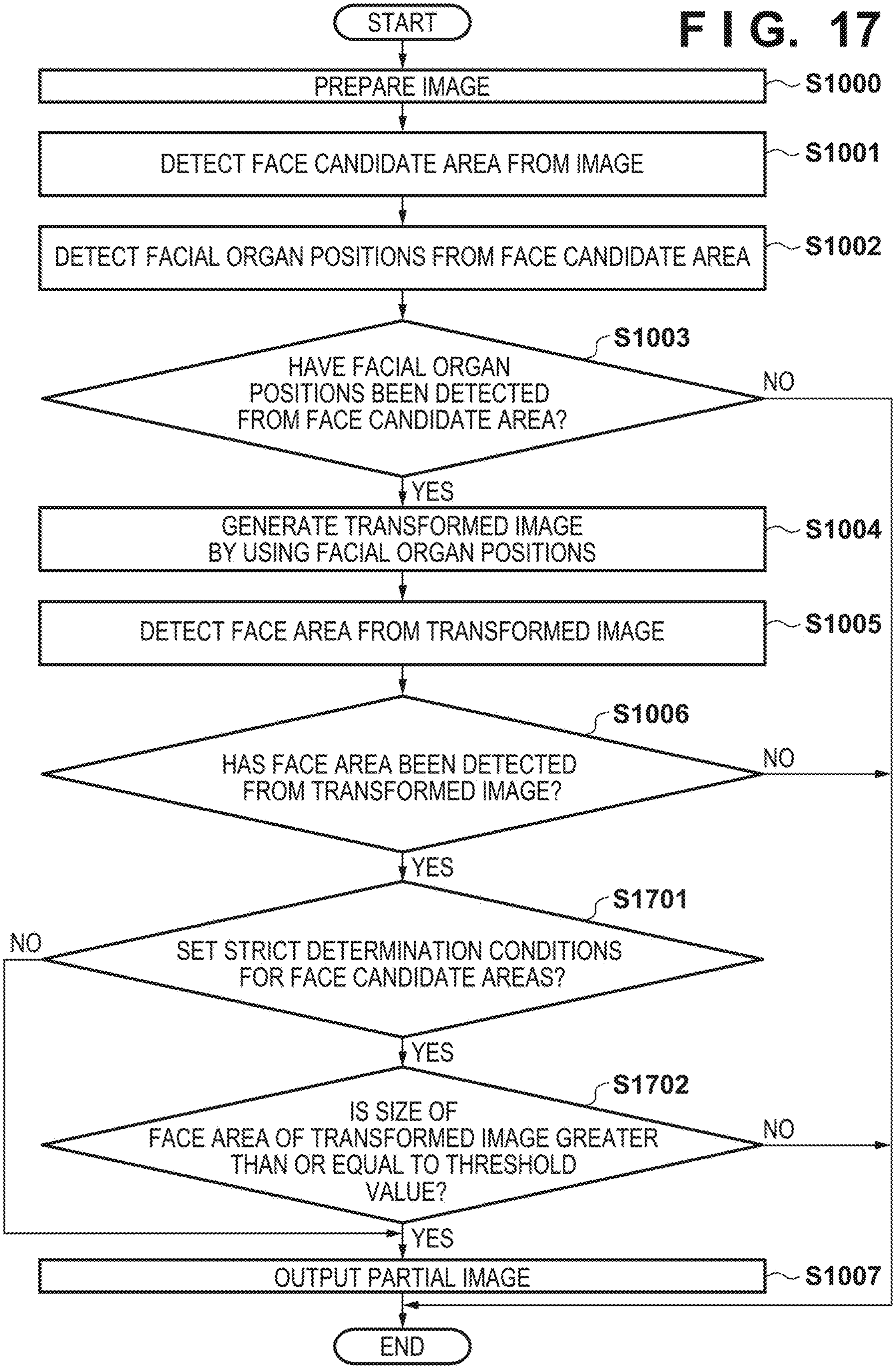
FIG. 17 is a flowchart illustrating the flow of image processing (the second embodiment).

FIG. 17 is a flowchart illustrating the flow of image processing according to the second embodiment. The processing from S1000 to S1007 is the same as that in the first embodiment, and therefore the description thereof will be omitted.

In S1701, the control unit 1102 determines whether or not to set strict determination conditions for face candidate areas based on the purpose of the image data received from the purpose input unit 1101. If the control unit 1102 determines that strict determination conditions for face candidate areas are to be set (Yes in S1701), processing proceeds to S1702. If the control unit 1102 determines that strict determination conditions for face candidate areas are not to be set (No in S1701), processing proceeds to S1007.

In S1702, the determination unit 304 determines whether or not the size of the face area in the transformed image detected in S1006 is greater than or equal to a threshold value. If the determination unit 304 determines that the size of the face area in the transformed image detected in S1006 is greater than or equal to the threshold value (Yes in S1702), processing proceeds to S1007. If the determination unit 304 determines that the size of the face area in the transformed image detected in S1006 is not greater than or equal to the threshold value (No in S1702), processing ends.

Figure 18:
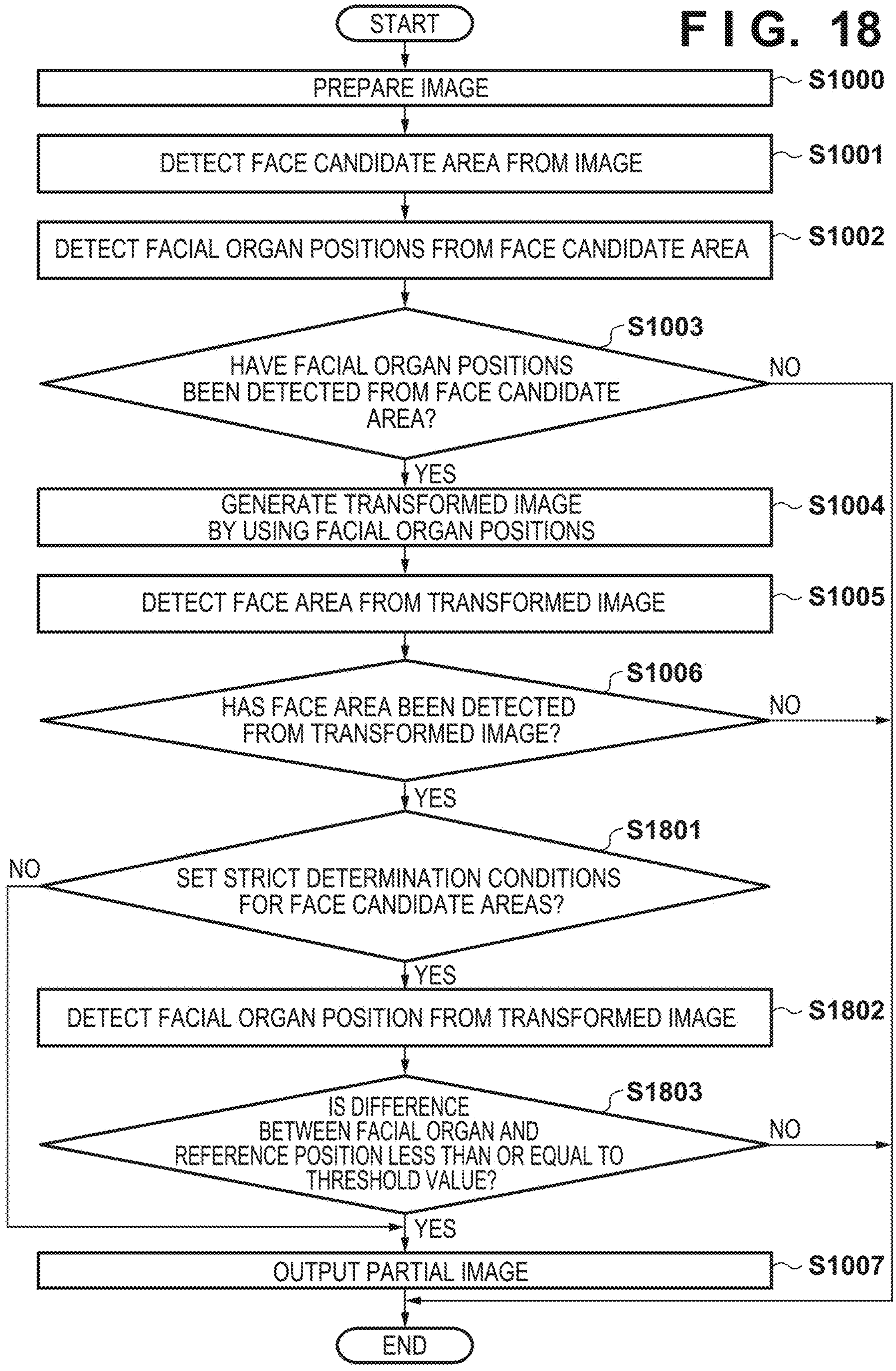
FIG. 18 is a flowchart illustrating the flow of image processing (the second embodiment).

FIG. 18 is a flowchart illustrating the flow of image processing according to the second embodiment. The processing from S1000 to S1007 is the same as that in the first embodiment, and therefore the description thereof will be omitted.

In S1801, the control unit 1102 determines whether or not to set strict determination conditions for face candidate areas based on the purpose of the image data received from the purpose input unit 1101. If the control unit 1102 determines that strict determination conditions for face candidate areas are to be set (Yes in S1801), processing proceeds to S1802. If the control unit 1102 determines that strict determination conditions for face candidate areas are not to be set (No in S1801), processing proceeds to S1007.

In S1802, the facial organ detection unit 301 detects the facial organ positions from the face area in the transformed image detected in S1006, processing proceeds to S1803.

In S1803, the determination unit 304 determines whether or not the difference between the positions of the facial organs in the face area in the transformed image and the reference positions in the transformed image is less than or equal to a threshold value. If the determination unit 304 determines that the difference between the positions of the facial organs in the face area in the transformed image and the reference positions in the transformed image is less than or equal to the threshold value (Yes in S1803), processing proceeds to S1007. If the determination unit 304 determines that the difference between the positions of the facial organs in the face area in the transformed image and the reference positions is not less than or equal to the threshold value (No in S1803), processing ends.

As described above, according to the second embodiment, it is possible to generate a partial image of quality suited to the purpose of the image by changing the determination conditions for face candidate areas based on the purpose of the image.

Third Embodiment

In the third embodiment, a geometric transformation (for example, affine transformation) is performed on an image based on the facial organ positions in a face candidate area in the image. In the third embodiment, it is determined whether or not to output information indicating a face candidate area as information indicating the area of the face, based on the result of detecting a face area from a transformed image. In addition, in the third embodiment, processing is performed to register, authenticate, or learn a partial image depending on the purpose of the partial image. Hereinafter, in the third embodiment, the differences from the first and second embodiments will be described.

Figure 19:
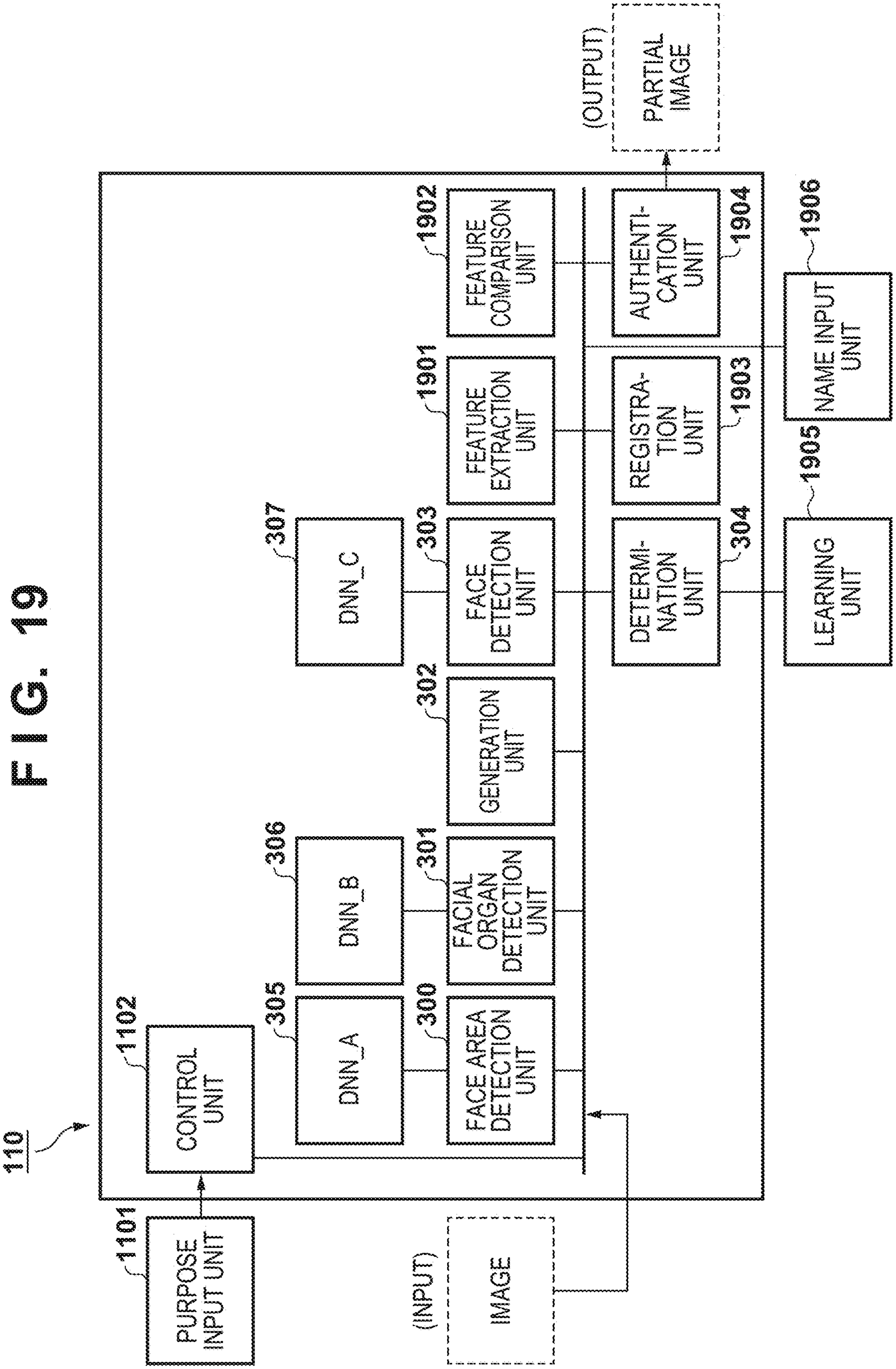
FIG. 19 is a block diagram showing an example of a functional configuration of an image processing apparatus (a third embodiment).

FIG. 19 is a block diagram showing an example of a functional configuration of an image processing apparatus according to the third embodiment.

The image processing apparatus 110 includes a feature extraction unit 1901, a feature comparison unit 1902, a registration unit 1903, an authentication unit 1904, a learning unit 1905, and a name input unit 1906.

When the Purpose of the Image is Registration

Hereinafter, the functions of the above-described units when the input from the purpose input unit 1101 is registration will be described.

If the determination unit 304 determines that a face area has been detected from the transformed image, the feature extraction unit 1901 receives a partial image from the generation unit 302. Next, the feature extraction unit 1901 extracts features from the partial image. For example, the feature extraction unit 1901 extracts numerical vectors from the partial image as features of the partial image. Note that the features of the partial image are not limited to numerical vectors, but may be other features. Thereafter, the feature extraction unit 1901 transmits the features extracted from the partial image to the registration unit 1903.

The registration unit 1903 registers the features of the partial image received from the feature extraction unit 1901 in a list in the storage unit 207 or the like. In addition, the registration unit 1903 receives a name corresponding to the features registered in the list in the storage unit 207 or the like from the name input unit 1906 and registers the name in the list in the storage unit 207 or the like.

The name input unit 1906 includes a user interface (UI) that is used to input a name corresponding to the features of the partial image registered by the registration unit 1903. The user inputs the name of the person captured in the partial image input to the image processing apparatus 110, using the name input unit 1906.

When the Purpose of the Image is Authentication

Hereinafter, the functions of the above-described units when the input from the purpose input unit 1101 is authentication will be described.

If the determination unit 304 determines that a face area has been detected from the transformed image, the feature extraction unit 1901 receives a partial image from the generation unit 302. Next, the feature extraction unit 1901 extracts features from the partial image. For example, the feature extraction unit 1901 extracts numerical vectors from the partial image as features of the partial image. Note that the features of the partial image are not limited to numerical vectors, but may be features in the same format as the features already registered in the registration unit 1903.

The feature comparison unit 1902 compares the features of the partial image received from the feature extraction unit 1901 with the features of the partial image already registered in the registration unit 1903. The feature comparison unit 1902 transmits the result of the comparison to the authentication unit 1904. Here, the feature comparison unit 1902 calculates the differences between the features extracted from the partial image and the features already registered in the registration unit 1903. For example, each difference is the cosine similarity, the L1 distance, the L2 distance, or the like between two numerical vectors.

The authentication unit 1904 receives the differences between the features of the partial images as the result of comparison from the feature comparison unit 1902. Next, if the smallest difference among the differences between the features of the partial images is less than or equal to a threshold value, the authentication unit 1904 outputs the name of the person captured in the partial image corresponding to the smallest difference as the result of the authentication. On the other hand, if the smallest difference among the received differences between the features of the partial images is not less than or equal to the threshold value, the authentication unit 1904 outputs the result of the authentication indicating "no matching person".

When the Purpose of the Image is Training

Hereinafter, the functions of the above-described units when the input from the purpose input unit 1101 is training will be described.

The name input unit 1906 includes a user interface (UI) that is used to input a name corresponding to the features of the partial image registered by the registration unit 1903. The user inputs the name of the person captured in the image input to the image processing apparatus 110, using the name input unit 1906.

If it is determined that a face area has been detected from the transformed image, the determination unit 304 transmits the partial image to the learning unit 1905. Furthermore, the determination unit 304 receives the name of the person captured in the partial image from the name input unit 1906, and transmits the partial image and the name of the person captured in the partial image to the learning unit 1905.

The learning unit 1905 learns the partial image and the name of the person captured in the partial image received from the determination unit 304. For example, the learning unit 1905 is a DNN that extracts features from a partial image, but is not limited to such a DNN and may be, for example, a DNN for detecting a face from a partial image.

As described above, according to the third embodiment, the processing performed to register, authenticate, or learn a partial image can be controlled depending on the purpose of the partial image.

According to the present invention, it is possible to improve the accuracy of extracting an image in which a person's face is captured from images.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:

at least one memory storing instructions; and at least one processor, upon execution of the stored instructions, wherein the stored instructions cause the at least one processor to:

(1) detect a face candidate area from an image, using a face detector;

(2) acquire a position of a facial organ from an image of the face candidate area, using a facial organ detector;

(3) generate a transformed image obtained by transforming the image of the face candidate area based on the position of the facial organ;

(4) control whether or not to output the image of the face candidate area based on a result of a face detection process performed on the transformed image;

(5) input a purpose of the image; and (6) change, based on the purpose of the image, at least one of (a) a condition for detecting the position of the facial organ from the image of the face candidate area, (b) a condition for detecting the face from the transformed image, (c) a condition for generating the transformed image transformed based on the position of the facial organ detected from the image of the face candidate area, and (d) a condition for outputting the image of the face candidate area.

2. The image processing apparatus according to claim 1, wherein a first face detector used for detecting the face candidate area is constituted by a neural network different from that of a second face detector used for performing the face detection process on the transformed image.

3. The image processing apparatus according to claim 2, wherein the first face detector is a neural network trained using an image in which a human face is captured, wherein the facial organ detector is a neural network trained using the image of the face candidate area, and wherein the second face detector is a neural network trained using the transformed image.

4. The image processing apparatus according to claim 2, wherein the first face detector is a neural network having a smaller size and a lower correct detection rate than the second face detector, and wherein the second face detector is a neural network having a larger size and a higher correct detection rate than the first face detector.

5. The image processing apparatus according to claim 1, wherein the image of the face candidate area is output as a face image when a face is detected from the transformed image.

6. The image processing apparatus according to claim 5, wherein outputting the image of the face candidate area as a face image is suppressed when the face is not detected from the transformed image.

7. The image processing apparatus according to claim 1, wherein a transformed image obtained by transforming the image of the face candidate area is generated, based on a difference between (1) the position of the facial organ detected from the image of the face candidate area and (2) a reference position defined as the position of the facial organ in the transformed image.

8. The image processing apparatus according to claim 1, wherein when the condition for detecting the position of the facial organ from the image of the face candidate area is changed, whether or not to detect the positions of the face organs from the image of the face candidate area is determined, based on whether or not a proportion of a portion of the face candidate area that protrudes outwards of the image to the face candidate area is less than or equal to a threshold value.

9. The image processing apparatus according to claim 1, wherein when the condition for detecting the face from the transformed image is changed, whether or not to detect the face from the transformed image is determined based on whether or not a difference between the position of the facial organ detected from the image of the face candidate area and a reference position defined as the position of the facial organ in the transformed image is less than or equal to a threshold value.

10. The image processing apparatus according to claim 9, wherein when a condition for outputting information indicating the face candidate area as information indicating an area of the face is changed, whether or not to output the image of the face candidate area is determined based on whether or not a number of times the face is detected from the transformed image is greater than or equal to a threshold value.

11. The image processing apparatus according to claim 1, wherein when the condition for generating the transformed image transformed based on the position of the facial organ detected from the image of the face candidate area is not changed, whether or not to generate the transformed image transformed is determined based on the position of the facial organ detected from the image of the face candidate area, based on whether or not a likelihood of the face candidate area is less than or equal to a threshold value and whether or not a likelihood of the position of the facial organ detected from the face candidate area is less than or equal to a threshold value.

12. The image processing apparatus according to claim 1, wherein when the condition for detecting the position of the facial organ from the image of the face candidate area is changed, detection of the position of the facial organ from the image of the face candidate area is determined.

13. The image processing apparatus according to claim 1, wherein when the condition for outputting information indicating the face candidate area as information indicating an area of the face is changed, whether or not to output the image of the face candidate area is determined based on whether or not the face detected from the transformed image has a size that is greater than or equal to a threshold value.

14. The image processing apparatus according to claim 1, wherein when the condition for outputting information indicating the face candidate area as information indicating an area of the face is changed, whether or not to output the image of the face candidate area is determined based on whether or not a difference between the position of the facial organ in the face candidate area detected as the face candidate are from the transformed image and a reference position defined as the position of the facial organ in the transformed image is less than or equal to a threshold value.

15. The image processing apparatus according to claim 1, wherein the stored instructions further cause the at least one processor to:

extract a feature from the transformed image when the face is detected from the transformed image;

register the feature of the transformed image and a name of a person corresponding to the feature of the transformed image; and output a name of a person captured in the transformed image based on a result of a comparison between the feature of the extracted image and the feature of the registered transformed image.

16. The image processing apparatus according to claim 1, wherein the purpose of the transformed image is at least one of (1) training through which an image learning model is made to learn the transformed image, (2) registration through which the feature of the transformed image and a name of a person corresponding to the feature of the transformed image are registered, and (3) authentication through which a name of a person captured in the transformed image is output.

17. The image processing apparatus according to claim 16, wherein the stored instructions further cause at least one processor to:

register the feature of the transformed image and a name of a person corresponding to the feature of the transformed image; and output a name of a person captured in the transformed image based on a result of a comparison between the feature of the transformed image extracted from the transformed image and the feature of the registered image, wherein when the purpose of the transformed image is the registration, the feature of the transformed image extracted from the transformed image is registered.

18. An image processing method that is executed by an image processing apparatus, the image processing method comprising:

detecting a face candidate area from an image, using a face detector;

acquiring a position of a facial organ from an image of the face candidate area, using a facial organ detector;

generating a transformed image obtained by transforming the image of the face candidate area based on the position of the facial organ;

controlling whether or not to output the image of the face candidate area as a face image based on a result of a face detection process performed on the transformed image;

inputting a purpose of the image; and changing, based on the purpose of the image, at least one of (a) a condition for detecting the position of the facial organ from the image of the face candidate area, (b) a condition for detecting the face from the transformed image, (c) a condition for generating the transformed image transformed based on the position of the facial organ detected from the image of the face candidate area, and (d) a condition for outputting the image of the face candidate area.

19. A non-transitory computer-readable storage medium storing a program for causing a computer to execute a method, the method comprising:

detecting a face candidate area from an image, using a face detector;

acquiring a position of a facial organ from an image of the face candidate area, using a facial organ detector;

generating a transformed image obtained by transforming the image of the face candidate area based on the position of the facial organ;

controlling whether or not to output the image of the face candidate area as a face image based on a result of a face detection process performed on the transformed image;

inputting a purpose of the image; and changing, based on the purpose of the image, at least one of (a) a condition for detecting the position of the facial organ from the image of the face candidate area, (b) a condition for detecting the face from the transformed image, (c) a condition for generating the transformed image transformed based on the position of the facial organ detected from the image of the face candidate area, and (d) a condition for outputting the image of the face candidate area.

* * * * *